(12) United States Patent
Liu

(10) Patent No.: US 8,036,080 B2
(45) Date of Patent: Oct. 11, 2011

(54) METHOD AND APPARATUS OF DISCRIMINATING DIFFERENT TYPES OF OPTICAL DISCS

(75) Inventor: Wei-Wu Liu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 232 days.

(21) Appl. No.: 12/477,279

(22) Filed: Jun. 3, 2009

(65) Prior Publication Data
US 2010/0014403 A1    Jan. 21, 2010

(30) Foreign Application Priority Data

Jul. 18, 2008 (TW) ................................ 97127464 A

(51) Int. Cl.
*G11B 7/00* (2006.01)
(52) U.S. Cl. ....................................................... 369/53.22
(58) Field of Classification Search ................. 369/53.2, 369/53.22, 53.23, 47.27, 47.1, 53.1
See application file for complete search history.

(56) References Cited

U.S. PATENT DOCUMENTS

| | | | |
|---|---|---|---|
| 6,298,024 B1 * | 10/2001 | Nomura ..................... | 369/53.22 |
| 6,301,201 B1 * | 10/2001 | Takeya ........................ | 369/30.1 |
| 6,816,443 B1 * | 11/2004 | Hwang ....................... | 369/44.32 |
| 6,982,941 B2 * | 1/2006 | Yamanoi et al. ........... | 369/53.22 |
| 7,046,606 B2 * | 5/2006 | Takahashi et al. .......... | 369/53.2 |
| 7,133,342 B2 | 11/2006 | Choi et al. | |
| 7,539,108 B2 * | 5/2009 | Maruyama et al. ......... | 369/53.35 |
| 7,564,754 B2 * | 7/2009 | Matsumoto ................ | 369/53.22 |
| 2001/0006211 A1 | 7/2001 | Choi et al. | |
| 2002/0041551 A1 | 4/2002 | Konno et al. | |
| 2004/0240357 A1 | 12/2004 | Takeya | |
| 2005/0276199 A1 | 12/2005 | Sugai | |
| 2006/0104176 A1 | 5/2006 | Ma et al. | |
| 2006/0239160 A1 | 10/2006 | Kim et al. | |
| 2007/0211587 A1 | 9/2007 | Kosaki | |
| 2008/0002548 A1 | 1/2008 | Jeong | |

FOREIGN PATENT DOCUMENTS

| | | |
|---|---|---|
| CN | 1300053 A | 6/2001 |
| CN | 1348182 A | 5/2002 |
| CN | 1722272 A | 1/2006 |

* cited by examiner

*Primary Examiner* — Nabil Z Hindi
(74) *Attorney, Agent, or Firm* — WPAT, PC; Justin King

(57) ABSTRACT

A method for discriminating different types of optical discs includes the steps of focusing a beam spot generated by a laser source on an optical disc, and rotating the optical disc; generating a radio frequency signal and a corresponding first signal of the radio frequency signal; comparing a peak-to-peak value of the corresponding first signal with a predetermined value; determining the optical disc as a high density optical disc when the peak-to-peak value of the first signal is smaller than the predetermined value; and, determining the optical disc as a low density optical disc when the peak-to-peak value of the first signal is greater than the predetermined value.

15 Claims, 21 Drawing Sheets

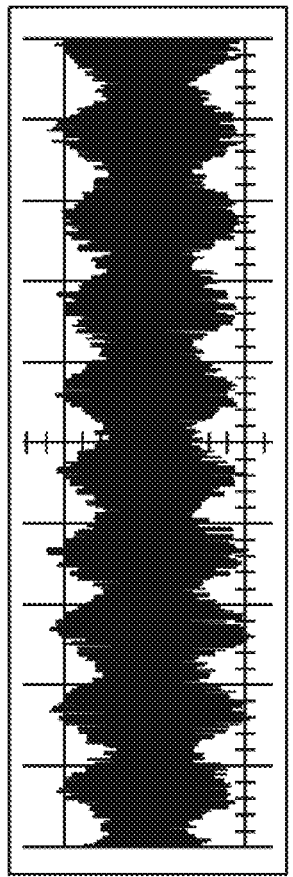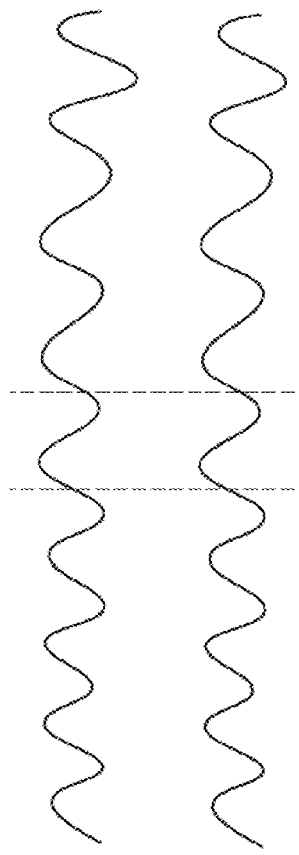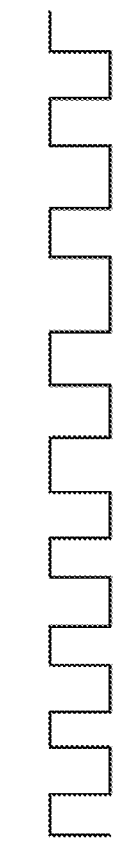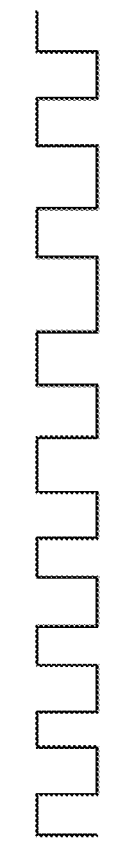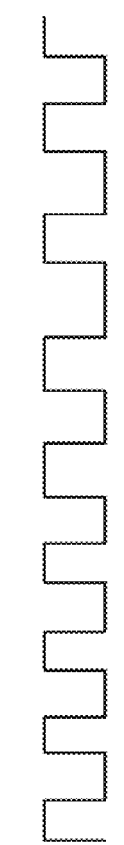
FIG.4A PRIOR ART
FIG.4B PRIOR ART
FIG.4C PRIOR ART
FIG.4D PRIOR ART
FIG.4E PRIOR ART
HD-DVD

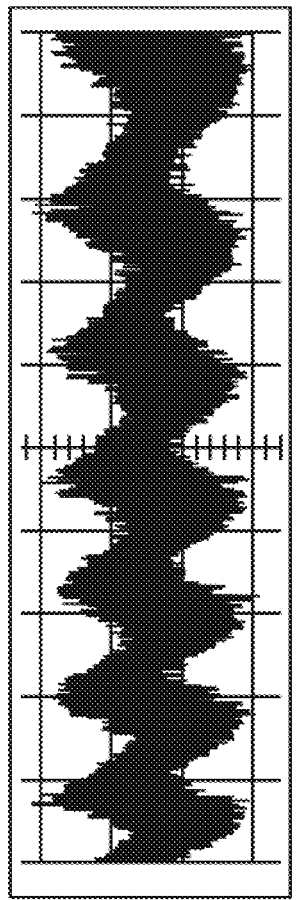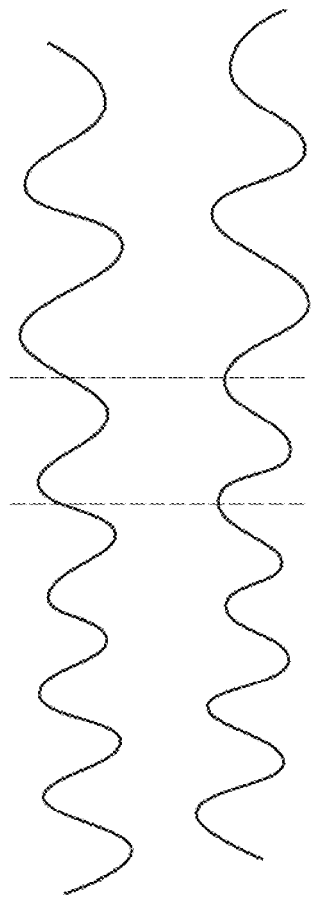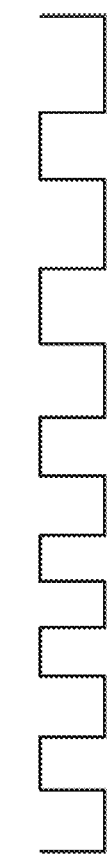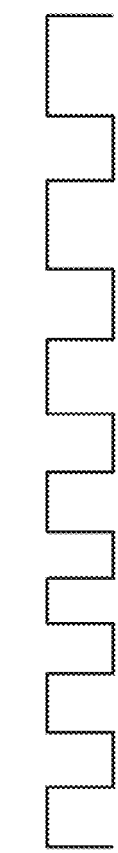
FIG.4F PRIOR ART
FIG.4G PRIOR ART
FIG.4H PRIOR ART
FIG.4I PRIOR ART
FIG.4J PRIOR ART

DPD TE

HD-DVD

DPP TE

HD-DVD

DPD TE

Blank DVD-R

DPP TE

Blank DVD-R

DPD TE

DVD-ROM

DPP TE

DVD-ROM

DPD TE

DVD-R with recorded data

DPP TE

DVD-R with recorded data

METHOD AND APPARATUS OF DISCRIMINATING DIFFERENT TYPES OF OPTICAL DISCS

FIELD OF THE INVENTION

The present invention relates to a method for discriminating different types of optical discs, and more particularly, to a method applied for discriminating low density optical discs from high density optical ones.

BACKGROUND OF THE INVENTION

Nowadays, the optical disk drive industry has developed from conventional optical disk drives to blue-ray optical disk drives. In general, the conventional optical disk drive can read CD and DVD only. That is, the optical pickup head of the conventional optical disk drive has a CD laser source and a DVD laser source, where these two laser sources belong to red light with a longer wavelength. Be compared with the conventional optical disk drive, a blue-ray optical disk drive can read a high density optical disc, such as a blue-ray disc or an HD-DVD. In other words, the optical discs can be divided into two categories, wherein the conventional CDs and DVDs belong to low density optical discs while the blue-ray discs and HD-DVDs belong to high density optical discs.

In order to read/write the high density optical disc, the optical pickup head of the blue-ray optical disk drive has a CD laser source, a DVD laser source and a blue laser source, wherein the CD laser source and the DVD laser source belong to red light with a longer wavelength while the blue laser source belongs to blue light with a shorter wavelength.

Similar to the conventional optical disc, the blue-ray disc must discriminate the sorts of the optical disc, e.g. CDs, DVDs, blue-ray discs, and HD-DVDs, within the start-up procedure after the optical disc is inserted into the blue-ray optical disk drive. Actually, the technology for discriminating the CD from the DVD in the conventional optical disk drive is quite ripe. Hence, in the following, various conventional methods for discriminating low density optical discs from high density optical discs are provided.

Please refer to FIG. 1A and FIG. 1B. FIG. 1A and FIG. 1B are diagrams illustrating a first conventional method for discriminating low density optical discs from high density optical discs according to prior art. This first conventional method has been disclosed in a US Patent Publication No. 2006/0104176, which differentiates the types of the optical disc by detecting a distance between a data layer and a surface of the optical disc. As can be seen from FIG. 1A, a thickness of a blue-ray disc is 1.2 mm, wherein a distance between a data layer 13 and a surface 11 of the blue-ray disc is 0.1 mm. A thickness of a DVD is 1.2 mm, wherein a distance between a data layer 33 and a surface 31 of the DVD is 0.6 mm. A thickness of a CD is 1.2 mm, wherein a distance between a data layer 53 and a surface 51 of the CD is 1.2 mm.

A working distance of a blue laser source in an optical pickup head is merely 0.5 mm, where this so-called working distance means a distance that the blue laser source can move up and down. As shown in FIG. 1B, by focusing a beam spot generated from the blue laser source on the blue-ray disc and moving the blue laser source in-between its working distance, two reflection signals can be generated, wherein the first reflection signal 81 is reflected and generated by the surface 11 of the blue-ray disc and the second reflection signal 82 is reflected and generated by the data layer 13 of the blue-ray disc.

On the other hand, by focusing a beam spot generated from the blue laser source on the DVD and moving the blue laser source in-between its working distance, only one reflection signal 83 can be generated. Due to the distance between the data layer 33 and the source 31 of the DVD being 0.6 mm, the reflection signal 83 is reflected and generated by the surface 31 of the DVD. That is, the focused beam spot of the blue laser source is unable to reach the data layer 33 of the DVD, so that other reflection signals cannot be generated. Similarly, only one reflection signal is generated by the CD. Hence, the optical disc can be determined as a low density optical disc or a high density optical disc according to the number of the reflection signals in the first conventional method. Be noted that the first conventional method differentiates the types of the optical disc according to the distance between the data layer and the surface of the optical disc. However, since the distance between the data layer and the surface of an HD-DVD is the same as that of a DVD, an HD-DVD cannot be discriminated from a DVD if the first conventional method is adopted.

Please refer to FIG. 2A, FIG. 2B and FIG. 2C, which are diagrams illustrating a second conventional method for discriminating low density optical discs from high density optical discs according to prior art. This second conventional method has been disclosed in a US Patent Publication No. 2004/0240357, which differentiates the types of the optical disc by using the feature that different photo detectors have different sensitivities to various wavelengths.

FIG. 2A shows an optical pickup head of a blue-ray optical disk drive, which consists of a CD laser source 101, a CD photo detector 104, a DVD laser source 102, a DVD photo detector 105, an HD-DVD laser source 103, an HD-DVD photo detector 106, and a plurality of optical elements.

In one word, beams radiated from the CD laser source 101 pass through the optical elements and then reach the optical disc 122, and reflected beams pass through the optical elements once again and are received by the CD photo detector 104. In addition, one part of the reflected beams are received by the CD photo detector 104, while another part of the reflected beams are received by the DVD photo detector 105 and the HD-DVD photo detector 106. Similarly, the reflected beams of the beams radiated from any laser source can be received by the CD photo detector 104, the DVD photo detector 105, and the HD-DVD photo detector 106. In other words, after the optical disc is inserted into the optical disk drive, the beams radiated from the CD laser source 101 are sent to the optical disc and the type of the optical disc can be determined according to the reflected beams received by the CD photo detector 104 and the HD-DVD photo detector 106 and their corresponding signals in the second conventional method.

Please refer to FIG. 2B, which is a diagram showing the corresponding signals when inserting the CD into the optical disk drive. When the CD is inserted into the optical disk drive, the beams are radiated from the CD laser source 101 and a focus of the beams is controlled according to forward-reverse movements of a focus driver. When the focus passes through the data layer of the CD, a S-curve is generated by a corresponding focusing error signal (FE) of the CD photo sensor 104, a sinusoid-curve is generated by a corresponding tracking error signal (TE) of the CD photo sensor 104, and a peak value is generated by a corresponding radio frequency signal (RF) of the CD photo sensor 104. As can be known from FIG. 2B, a peak-to-peak value of the S-curve in the focusing error signal FE of the CD photo sensor 104 is labeled as fe1, a peak-to-peak value of the sinusoid-curve in the tracking error signal TE of the CD photo sensor 104 is labeled as te1, and the peak value in the radio frequency signal RF of the CD photo sensor 104 is labeled as rf1.

In the meanwhile, when the focus passes through the data layer of the CD, a S-curve is generated by a corresponding focusing error signal (FE) of the HD-DVD photo sensor 106, a sinusoid-curve is generated by a corresponding tracking error signal (TE) of the HD-DVD photo sensor 106, and a peak value is generated by a corresponding radio frequency signal (RF) of the HD-DVD photo sensor 106. As can be known from FIG. 2B, a peak-to-peak value of the S-curve in the focusing error signal FE of the HD-DVD photo sensor 106 is labeled as fe2, a peak-to-peak value of the sinusoid-curve in the tracking error signal TE of the HD-DVD photo sensor 106 is labeled as te2, and the peak value in the radio frequency signal RF of the HD-DVD photo sensor 106 is labeled as rf2. After that, by comparing fe1 with fe2 or by reference to the difference or the ratio between the abovementioned values, it judges that if the CD is inserted into the optical disk drive.

Please refer to FIG. 2C, which is a diagram showing the corresponding signals when inserting the HD-DVD into the optical disk drive. When the HD-DVD is inserted into the optical disk drive, the beams are radiated from the CD laser source 101 and a focus of the beams is controlled according to forward-reverse movements of a focus driver. When the focus passes through the data layer of the HD-DVD, a S-curve is generated by a corresponding focusing error signal (FE) of the CD photo sensor 104, a sinusoid-curve is generated by a corresponding tracking error signal (TE) of the CD photo sensor 104, and a peak value is generated by a corresponding radio frequency signal (RF) of the CD photo sensor 104. As can be known from FIG. 2C, a peak-to-peak value of the S-curve in the focusing error signal FE of the CD photo sensor 104 is labeled as fe3, a peak-to-peak value of the sinusoid-curve in the tracking error signal TE of the CD photo sensor 104 is labeled as te3, and the peak value in the radio frequency signal RF of the CD photo sensor 104 is labeled as rf3.

In the meanwhile, when the focus passes through the data layer of the HD-DVD, a S-curve is generated by a corresponding focusing error signal (FE) of the HD-DVD photo sensor 106, a sinusoid-curve is generated by a corresponding tracking error signal (TE) of the HD-DVD photo sensor 106, and a peak value is generated by a corresponding radio frequency signal (RF) of the HD-DVD photo sensor 106. As can be known from FIG. 2C, a peak-to-peak value of the S-curve in the focusing error signal FE of the HD-DVD photo sensor 106 is labeled as fe4, a peak-to-peak value of the sinusoid-curve in the tracking error signal TE of the HD-DVD photo sensor 106 is labeled as te4, and the peak value in the radio frequency signal RF of the HD-DVD photo sensor 106 is labeled as rf4. After that, by comparing fe3 with fe4 or by reference to the difference or the ratio between the abovementioned values, it judges that the HD-DVD is inserted into the optical disk drive.

However, the abovementioned signals, including the FE signal, the TE signal and the RF signal might, are affected by the reflectivity of the optical discs. These signals may have different variations even if the optical discs with the same type are inserted into the optical disk drive. For this reason, the probability for erroneously discriminating the types of the optical discs may be risen. Besides, if the types of burnable optical discs are considered at the same time, the types of the burnable optical discs may be erroneously judged by reference to the signal energy only.

FIG. 3A~FIG. 3D are diagrams illustrating a third conventional method for discriminating low density optical discs from high density optical discs according to prior art. This third conventional method has been disclosed in a US Patent Publication No. 2007/0211587, which differentiates the types of the optical disc by using the feature that a low density optical disc and a high density optical disc have different track pitches and the feature that a blank optical disc and a recorded optical disc have different characteristics.

Please refer to FIG. 3A, which is a diagram showing track thicknesses of a DVD and an HD-DVD. As shown in FIG. 3A, all of the track pitches of the DVD are 0.74 μm, but the track pitch of the lead-in area in the HD-DVD is 0.68 μm while the track pitch of the data area in the HD-DVD is 0.4 μm. In addition, a single beam spot generated from the DVD laser source can be focused on the track of the DVD. A single beam spot generated from the DVD laser source can also be focused on the track of the lead-in area of the HD-DVD; while a signal beam spot generated by the DVD laser source can be simultaneously focused on several tracks of the data area of the HD-DVD. A tracking error signal formed by focusing a single beam spot on the optical disc is called as a differential phase detection tracking error signal (DPD TE signal). Generally speaking, the DPD TE signal can be generated when there is data recorded on the track of the optical disc, while the DPD TE signal cannot be generated when the optical disc is a blank optical disc.

Please refer to FIG. 3B, which is a diagram showing track thickness of a DVD and an HD-DVD. A tracking error signal formed by focusing three beam spots (including one main beam spot and two sub-beam spots) on the optical disc is called as a differential push pull tracking error signal (DPP TE signal). In general, the DPP TE signal can be generated when there is data recorded on the track of the optical disc, and the DPP TE signal can also be generated when the optical disc is a blank optical disc.

Please refer to FIG. 3C and FIG. 3D, which are flowcharts for discriminating different types of optical discs according to prior art. After the optical disc is inserted into the optical disk drive, the type of the optical disc is determined by using the DVD laser source. In Step A1, the rotating speed of the spindle motor in the optical disk drive is set as 1× speed. In Step A2, move the optical pickup head to the data area. In Step A3, wait until the rotating speed of the spindle motor reaches 1× speed. In Step A4, measure an eccentricity of the optical disc according to the DPD TE signal, and set it as LDD.

Next, in Step A5, compare LDD with a predetermined value Ref(LDD). When LDD is smaller than the predetermined value Ref(LDD), determine that there is data recorded on the optical disc and it is a DVD with a small eccentricity (Step A6). Otherwise, when LDD is greater than the predetermined value Ref(LDD), continue to proceed the judgment of the HD-DVD and the DVD (Step A7).

In Step A8, measure the eccentricity of the optical disc according to the DPP TE signal, and set it as DP. In Step A9, move the optical pickup head to the lead-in area. In Step A10, measure the eccentricity of the optical disk drive according to the DPP TE, and set it as SP.

After that, in Step A11, compare SP with DP. When SP is close to DP, it represents that the track pitch of the data area is equal to that of the lead-in area. As a result, the optical disc is determined as a blank DVD with a larger eccentricity (Step A12). Otherwise, when SP is not close to DP, move the optical pickup head to the data area again (Step A13).

In Step A14, the rotating speed of the spindle motor in the optical disk drive is set as 2× speed. In Step A15, measure the eccentricity of the optical disc according to the DPD TE signal, and set it as HDD.

Next, in Step A16, compare HDD with LDD. When HDD is close to LDD, it represents that the eccentricity is not affected by the rotating speed. Therefore, the optical disc is determined as a DVD-ROM with a large eccentricity (Step A17). Otherwise, when HDD is not close to LDD, it represents that the eccentricity is affected by the rotating speed. Therefore, the optical disc is determined as an HD-DVD (Step A18).

However, only when the rotating speed of the optical disc tends towards a stable status and both the track zero-crossing signals of the data area and the lead-in area are acquired, the judgment process will start to differentiate the types of the optical disc. The total judgment time of the third conventional method is indeed too long and not practical.

Please refer to FIG. 4A~FIG. 4J. FIG. 4A~FIG. 4J are diagrams illustrating a fourth conventional method for discriminating low density optical discs from high density optical discs according to prior art. This fourth conventional method has been disclosed in a US Patent Publication No. 2001/0006211, which differentiates the types of the optical disc by using an upper envelope signal and a lower envelope signal generated from the DPP TE signal.

FIG. 4A~FIG. 4E are diagrams showing the corresponding signals of an HD-DVD, wherein FIG. 4A represents the DPP TE signal of the HD-DVD, FIG. 4B represents the upper envelope signal of the DPP TE signal, FIG. 4C represents an inverted signal of the lower envelope signal of the DPP TE signal, FIG. 4D represents a digital signal generated by slicing the upper envelope signal of the DPP TE signal, and FIG. 4E represents another digital signal generated by slicing the lower envelope signal of the DPP TE signal. As can be known from FIG. 4D together with FIG. 4E, the phases of these two digital signals are almost identical, and thus the optical disc can be determined as an HD-DVD.

In addition, FIG. 4F~FIG. 4J are diagrams showing the corresponding signals of a DVD, wherein FIG. 4F represents the DPP TE signal of the DVD, FIG. 4G represents the upper envelope signal of the DPP TE signal, FIG. 4H represents an inverted signal of the lower envelope signal of the DPP TE signal, FIG. 4I represents a digital signal generated by slicing the upper envelope signal of the DPP TE signal, and FIG. 4J represents another digital signal generated by slicing the lower envelope signal of the DPP TE signal. As can be known from FIG. 4I and FIG. 4J, there is a phase difference of 90 degrees existed between the phases of these two digital signals, and thus the optical disc can be determined as the DVD.

Please note that the phase difference of the DPP TE signal is adopted for differentiating the types of the optical disc in the fourth conventional method. However, since an un-burnable ROM disc does not have the wobble signal, its DPP TE signal is not obvious to be the reference for differentiating the types of the optical disc.

FIG. 5A~FIG. 5D are diagrams illustrating a fifth conventional method for discriminating low density optical discs from high density optical discs according to prior art. This fifth conventional method has been disclosed in a US Patent Publication No. 2006/0239160, which performs a track search when proceeding a focus search and differentiates the types of the optical disc according to the TE signal and its track zero-crossing signal.

FIG. 5A shows the operations of the optical pickup head when proceeding the focus search. As can be seen from FIG. 5A, when the focus search is performed, the optical pickup head is moved along a direction perpendicular to the optical disc. That is, the optical pickup head is moved from a location 'a' to a location 'b' being farthest away from the optical disc, from the location 'b' to a location 'c' being closest to the optical disc, and from the location 'c' to a location 'd'.

FIG. 5B shows the operations of the optical pickup head when proceeding the track search. When the track search is performed, the optical pickup head is moved along a direction parallel to the optical disc. The optical pickup head is moved from a location 'e' to a location 'f', from the location 'f' to a location 'g', and from the location 'g' to a location 'h'.

After the optical disc is inserted into the optical disk drive, radiate the optical disc by using the blue laser source and proceed the focus search and the track search simultaneously. As shown in FIG. 5C, the S-curves of the focusing error signal FE and the tracking error signal TE can be simultaneously generated, and the track zero-crossing signal can be generated by slicing the tracking error signal TE. As can be seen from FIG. 5C, the track zero-crossing signal has a wider width, which means that the optical disc has a wider track pitch. Therefore, the optical disc is determined as a DVD.

As shown in FIG. 5D, the S-curves of the focusing error signal FE and the tracking error signal TE can be simultaneously generated when the optical disc is inserted into the optical disk drive, and the track zero-crossing signal can be generated by slicing the tracking error signal TE. As can be seen from FIG. 5D, the track zero-crossing signal has a narrower width, which means that the optical disc has a narrower track pitch. Therefore, the optical disc is determined as an HD-DVD.

Be noted that the blue light has a higher energy. If the blue light is used for differentiating the types of the optical disc in the fifth conventional method, it may write on a burnable optical disc.

FIG. 6A~FIG. 6I are diagrams illustrating a sixth conventional method for discriminating low density optical discs from high density optical discs according to prior art. This sixth conventional method has been disclosed in a US Patent Publication No. 2008/0002548, which differentiates the types of the optical disc according to a difference between the DPD TE signal and DPP TE signal generated by using the DVD laser source or the CD laser source to be radiated on different optical discs.

FIG. 6A and FIG. 6B respectively represent the DPD TE signal and the DPP TE signal of an HD-DVD. FIG. 6C and FIG. 6D respectively represent the DPD TE signal and the DPP TE signal of a DVD-R with recorded data. FIG. 6E and FIG. 6F respectively represent the DPD TE signal and the DPP TE signal of a DVD-ROM. FIG. 6G and FIG. 6H respectively represent the DPD TE signal and the DPP TE signal of a blank DVD-R.

In addition, by using a suitable predetermined level together with the aforementioned DPD TE signal and the DPP TE signal of each optical disc, the type of the optical disc can be determined. Please refer to FIG. 6I, which is a flowchart for discriminating different types of optical discs according to prior art. First, the DPD TE signal and the DPP TE signal are generated on the inserted optical disc (Step S108). Next, determine a relationship between the DPD TE signal and a first predetermined level (Step S110). In other words, when the DPD TE signal is equal or greater than the first predetermined level, go to Step S120; otherwise, when the DPD TE signal is smaller than the first predetermined level, go to Step S112.

In Step S112, determine a relationship between the DPP TE signal and a second predetermined level. In other words, when the DPP TE signal is equal or greater than the second predetermined level, the optical disc is determined as a blank DVD-R (Step S116); otherwise, when the DPP TE signal is smaller than the second predetermined level, the optical disc is determined as an HD-DVD (Step S114).

In Step S120, determine a relationship between the DPP TE signal and a third predetermined level. In other words, when the DPP TE signal is equal or greater than the third predetermined level, the optical disc is determined as a DVD-R with recorded data (Step S124); otherwise, when the DPP TE signal is smaller than the third predetermined level, the optical disc is determined as a DVD-ROM (Step S122).

However, since the TE signal might be easily affected by the reflectivity of the optical disc, the judgment result for differentiating the types of the optical disc might be interfered.

SUMMARY OF THE INVENTION

It is therefore one of the objectives of the present invention to provide a method for discriminating low density optical discs from high density optical discs according to a radio frequency signal.

According to an exemplary embodiment of the present invention, a method of discriminating different types of optical discs is provided, which is applied for differentiating whether an optical disc is a high density optical disc or a low density optical disc. The method includes the steps of focusing a beam spot generated by a laser source on the optical disc, and rotating the optical disc; generating a radio frequency signal and a corresponding first signal of the radio frequency signal; comparing a peak-to-peak value of the first signal with a predetermined value; and determining the optical disc as the high density optical disc when the peak-to-peak value of the first signal is smaller than the predetermined value, and determining the optical disc as the low density optical disc when the peak-to-peak value of the first signal is greater than the predetermined value.

In addition, according to another exemplary embodiment of the present invention, an apparatus for discriminating different types of optical discs is provided. The apparatus consists of a spindle motor, an optical pickup head, an amplifier, a lower envelope detector, a magnitude detector, a comparator and a controller. The spindle motor loads and rotates an optical disc. The optical pickup head radiates a laser source and focuses the laser source on the optical disc to generate a plurality of optical signals. The amplifier combines and amplifies the plurality of optical signals into a radio frequency signal. The lower envelope detector receives the radio frequency signal and generates a lower envelope signal in response to the radio frequency signal. The circuit determines whether the optical disc is a high density optical disc or a low density optical disc according to the lower envelope signal.

Moreover, according to another exemplary embodiment of the present invention, a method of discriminating different types of optical discs is provided, which is applied for differentiating whether an optical disc is a high density optical disc or a low density optical disc. The method includes the steps of focusing a beam spot generated by a laser source on the optical disc, and rotating the optical disc; generating a radio frequency signal and a corresponding first signal of the radio frequency signal; calculating the first signal to generate a count value; comparing the count value of the first signal with a predetermined count value; and determining the optical disc as the high density optical disc when the count value of the first signal is smaller than the predetermined count value, and determining the optical disc as the low density optical disc when the count value of the first signal is greater than the predetermined count value.

Additionally, according to another exemplary embodiment of the present invention, a method of discriminating different types of optical discs is provided, which is applied for differentiating whether an optical disc is a high density optical disc or a low density optical disc. The method includes the steps of focusing a beam spot generated by a laser source on the optical disc, and rotating the optical disc; generating a radio frequency signal and a corresponding lower envelope signal of the radio frequency signal; detecting a first peak-to-peak value of the radio frequency signal; detecting a second peak-to-peak value of the lower envelope signal; dividing the second peak-to-peak value by the first peak-to-peak value, so as to set as a first ratio; comparing the first ratio with a predetermined ratio; and determining the optical disc as the high density optical disc when the first ratio is smaller than the predetermined ratio, and determining the optical disc as the low density optical disc when the first ratio is greater than the predetermined ratio.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 4A~FIG. 4J are diagrams illustrating a fourth conventional method for discriminating low density optical discs from high density optical discs according to prior art;

DETAILED DESCRIPTION OF THE PREFERRED EMBODIMENT

The conventional CDs and DVDs belong to low density optical discs, while blue-ray discs and HD-DVDs belong to high density optical discs. For the low density optical discs, the narrowest track pitch of the data area in the DVD is 0.74 µm. For the high density optical discs, the track pitch of the data area in the blue-ray disc and the HD-DVD is 0.4 µm.

According to an embodiment of the present invention, the type of an optical disc can be determined by using a red laser source (e.g. a CD laser source or a DVD laser source) to be radiated on the optical disc and by reference to the generated radio frequency signal.

Figure 1A:
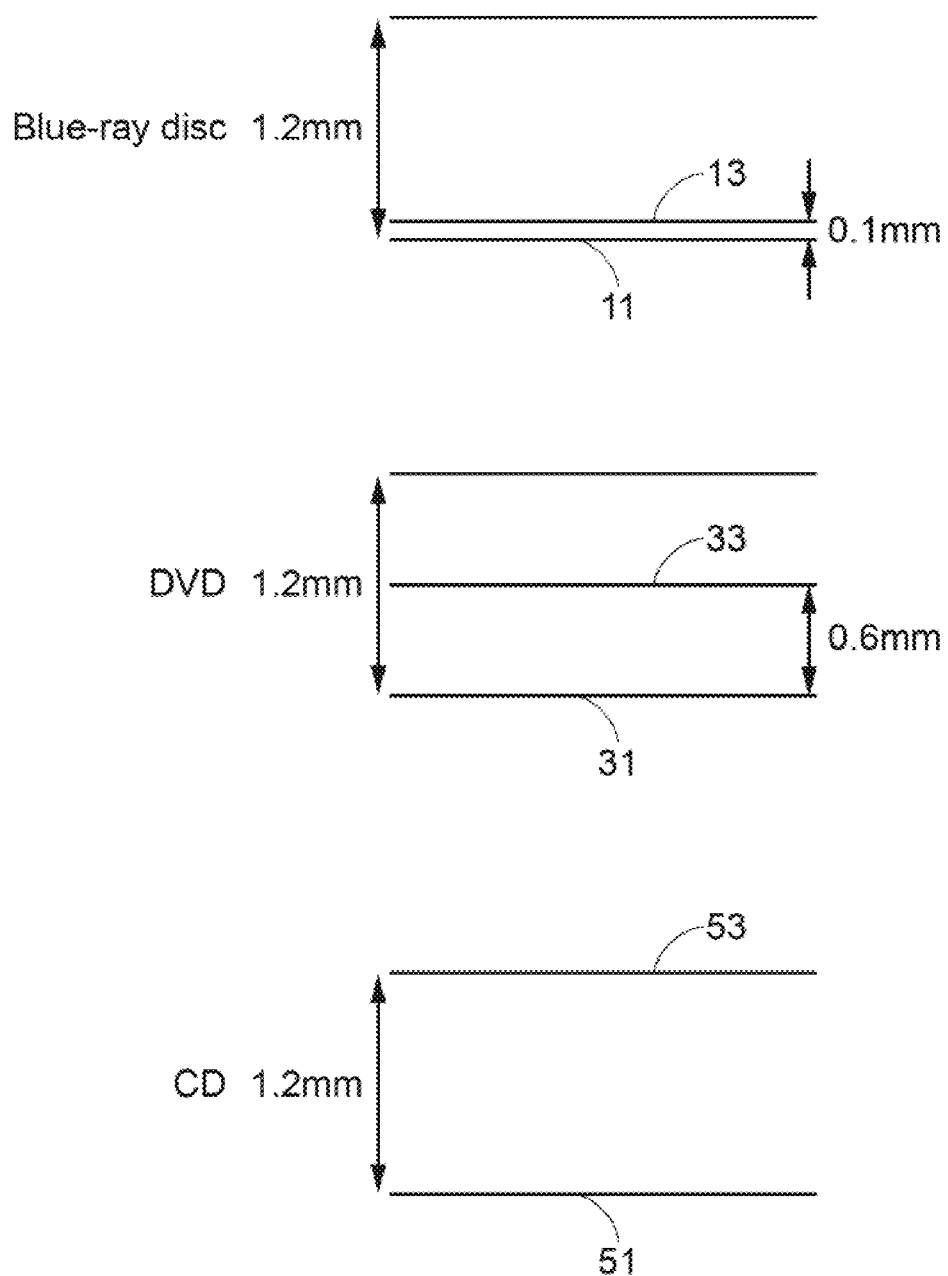
FIG. 1A and FIG. 1B are diagrams illustrating a first conventional method for discriminating low density optical discs from high density optical discs according to prior art.
Figure 1B:
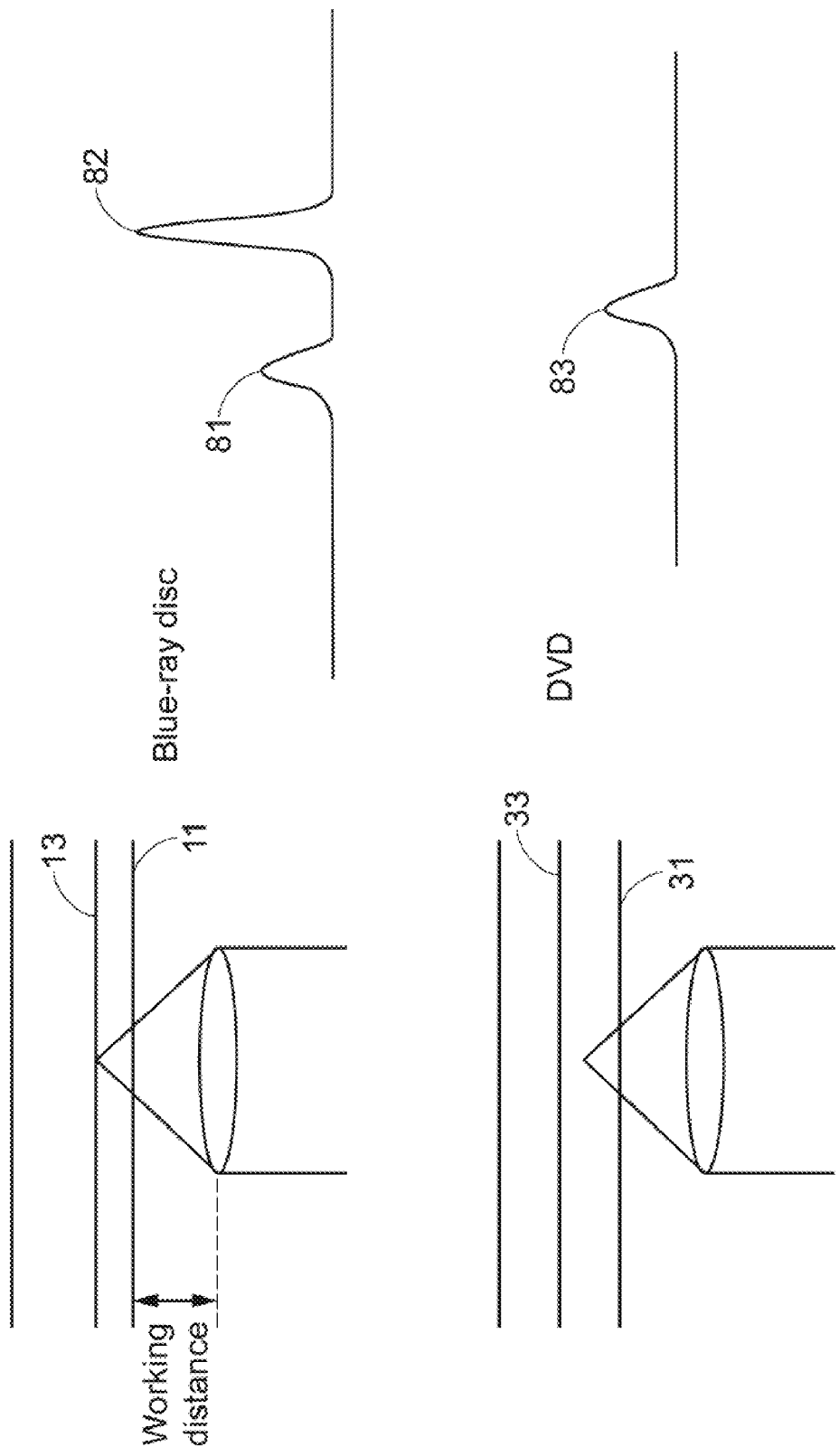
Figure 2A:
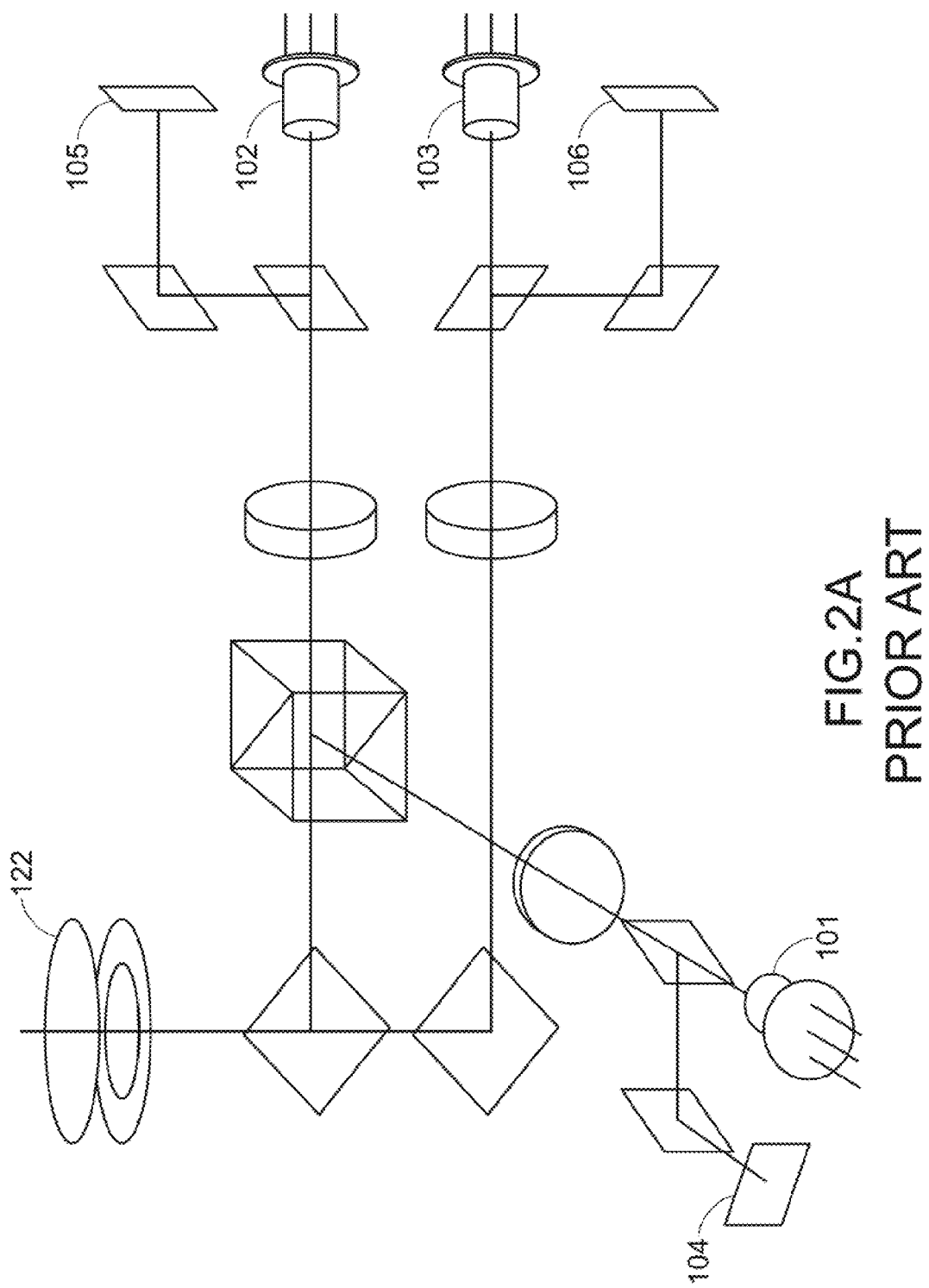
FIG. 2A, FIG. 2B and FIG. 2C are diagrams illustrating a second conventional method for discriminating low density optical discs from high density optical discs according to prior art.
Figure 2B:
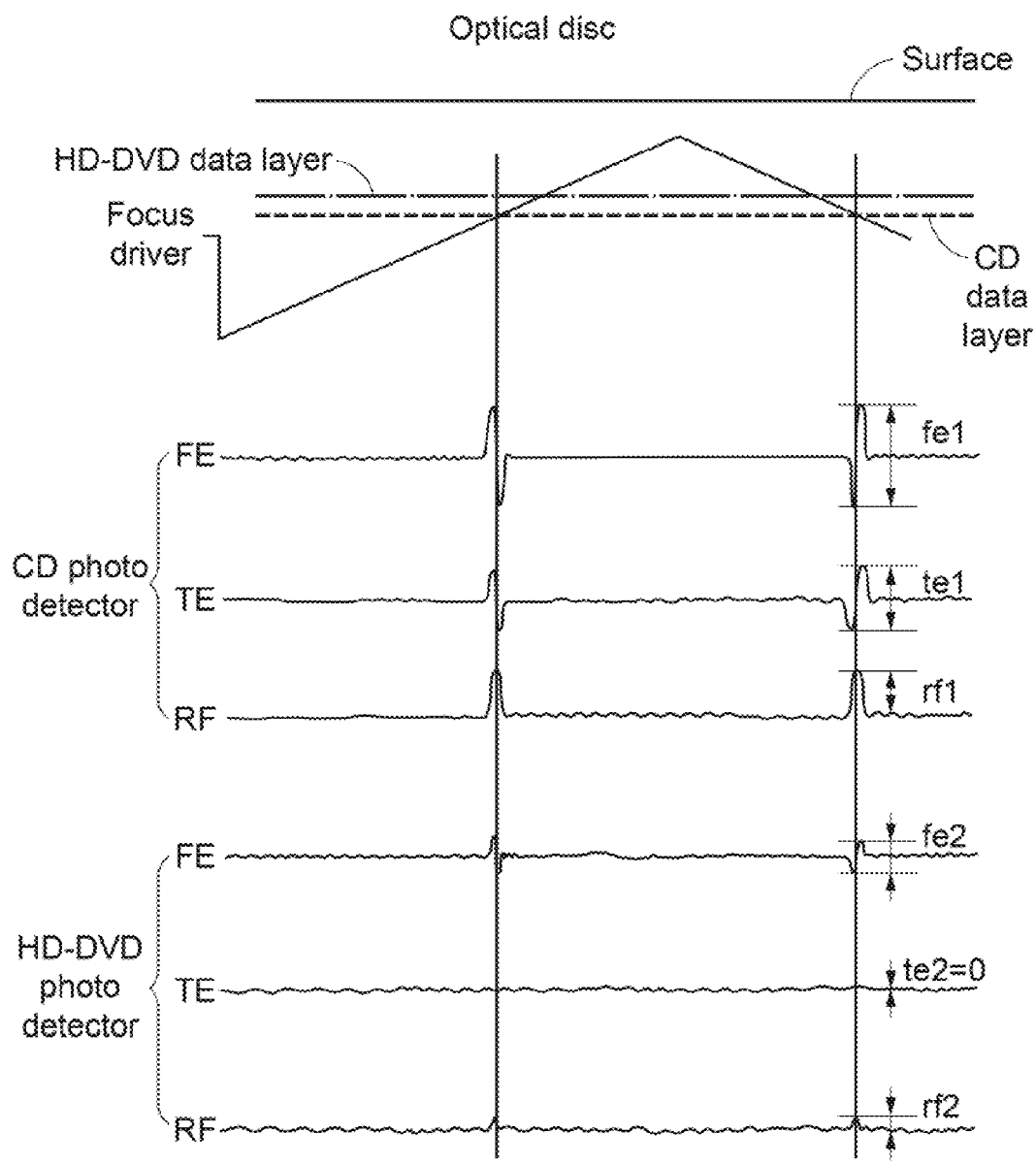
Figure 2C:
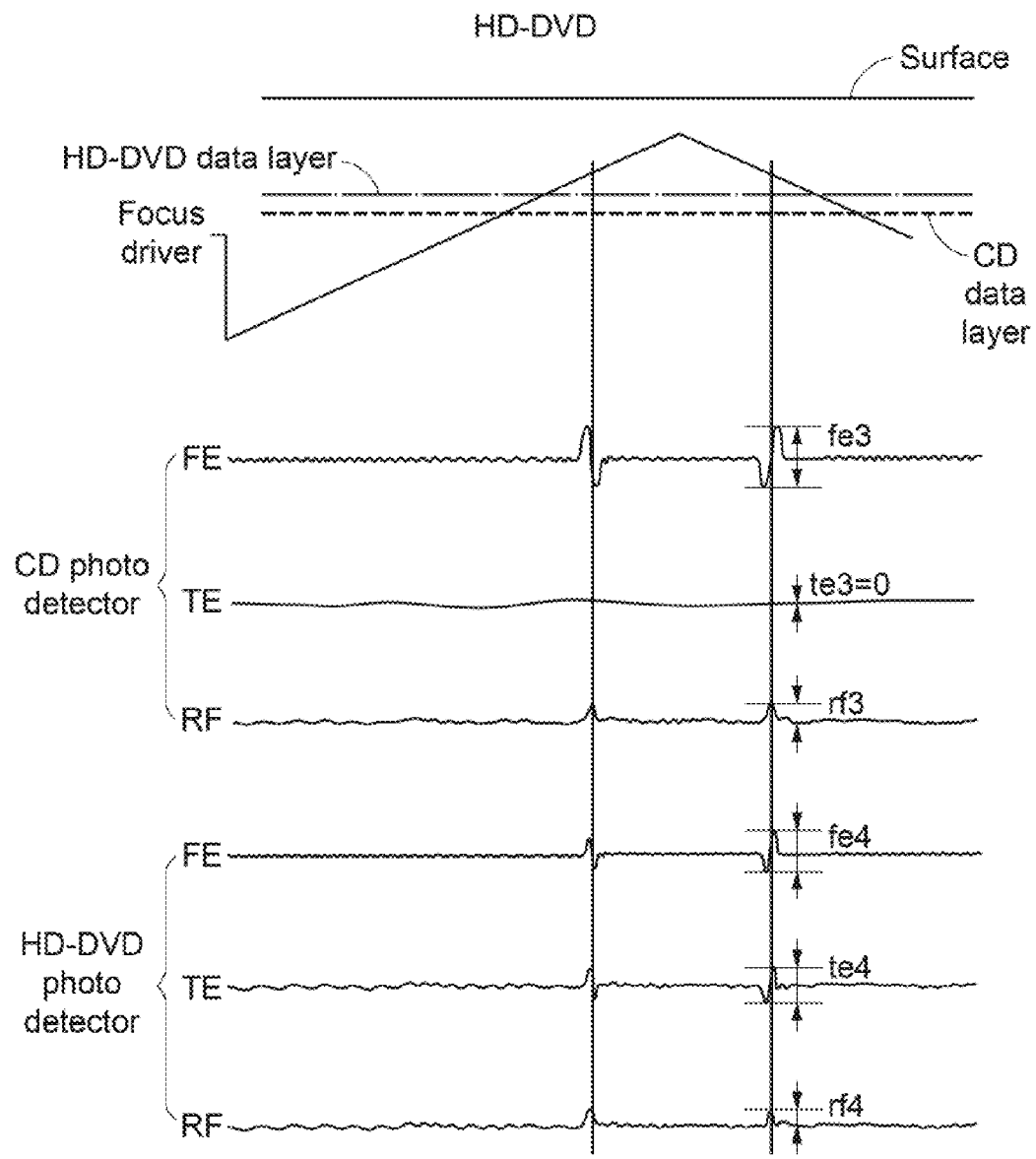
Figure 3A:
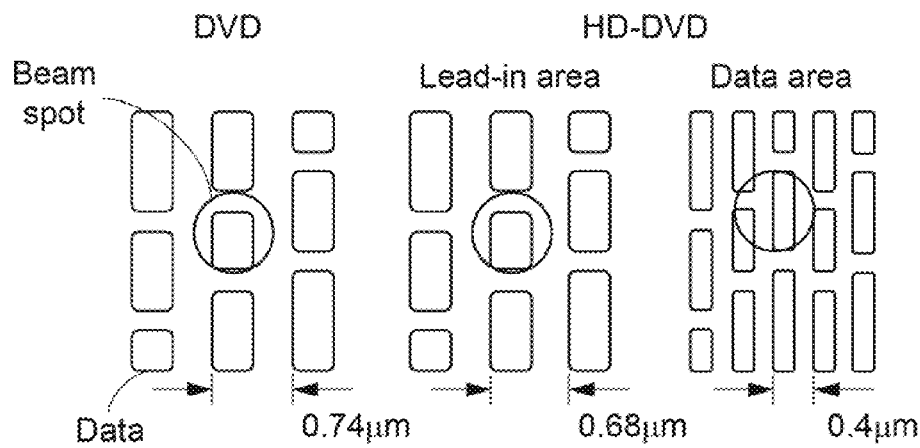
FIG. 3A~FIG. 3D are diagrams illustrating a third conventional method for discriminating low density optical discs from high density optical discs according to prior art.
Figure 3B:
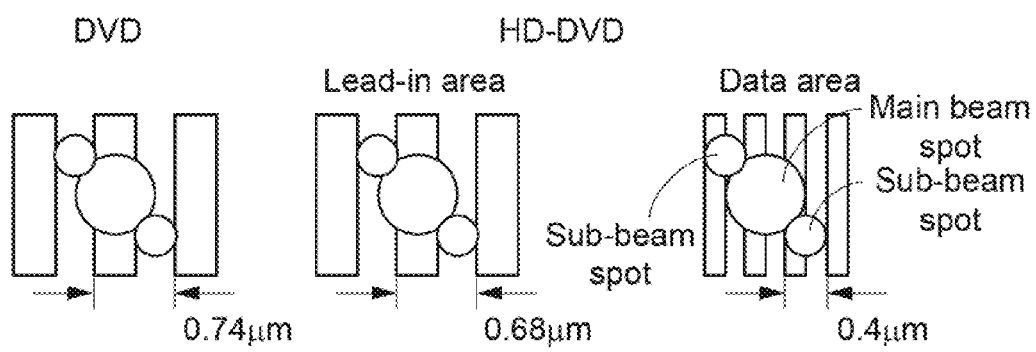
Figure 3C:
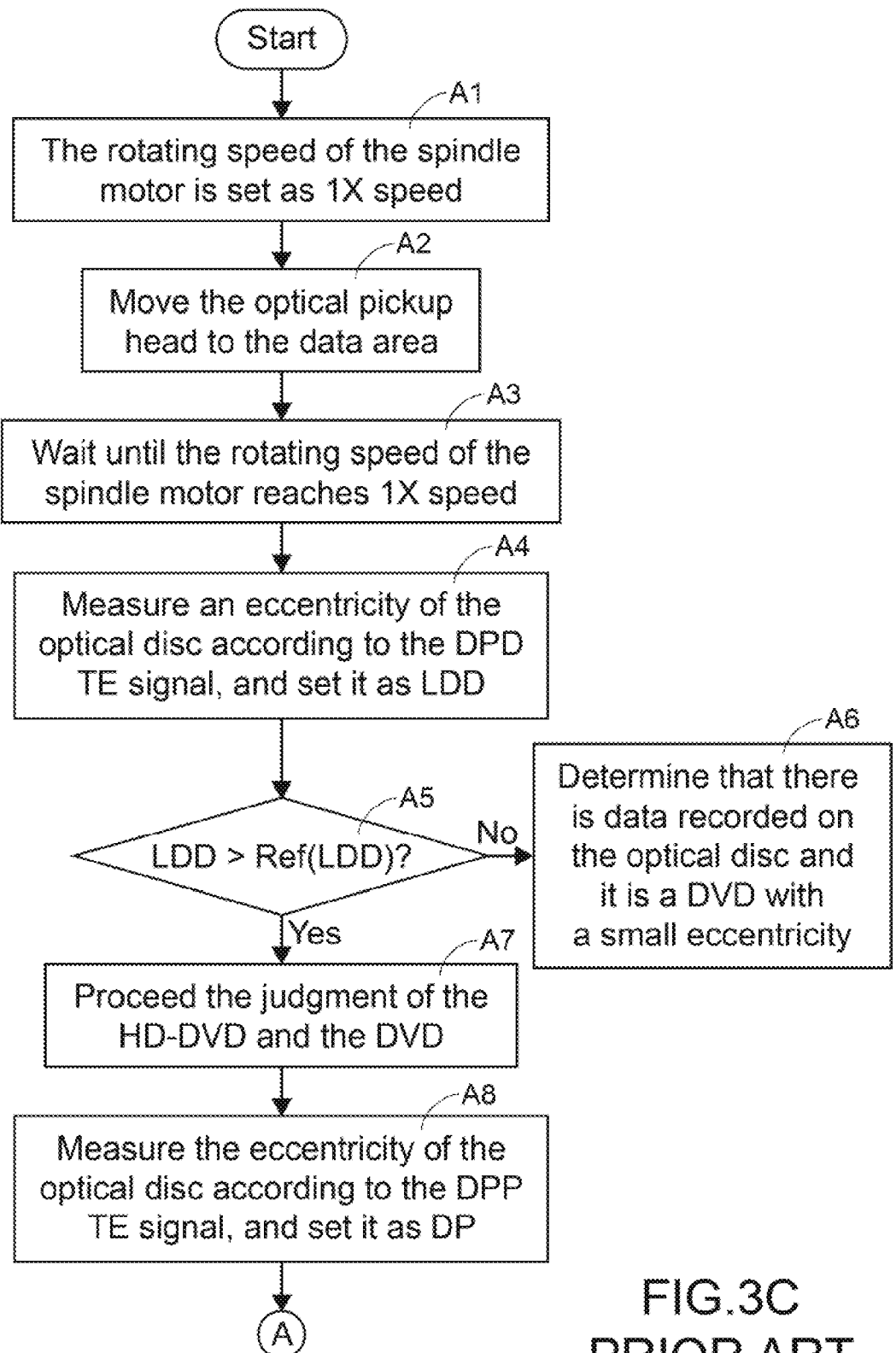
Figure 3D:
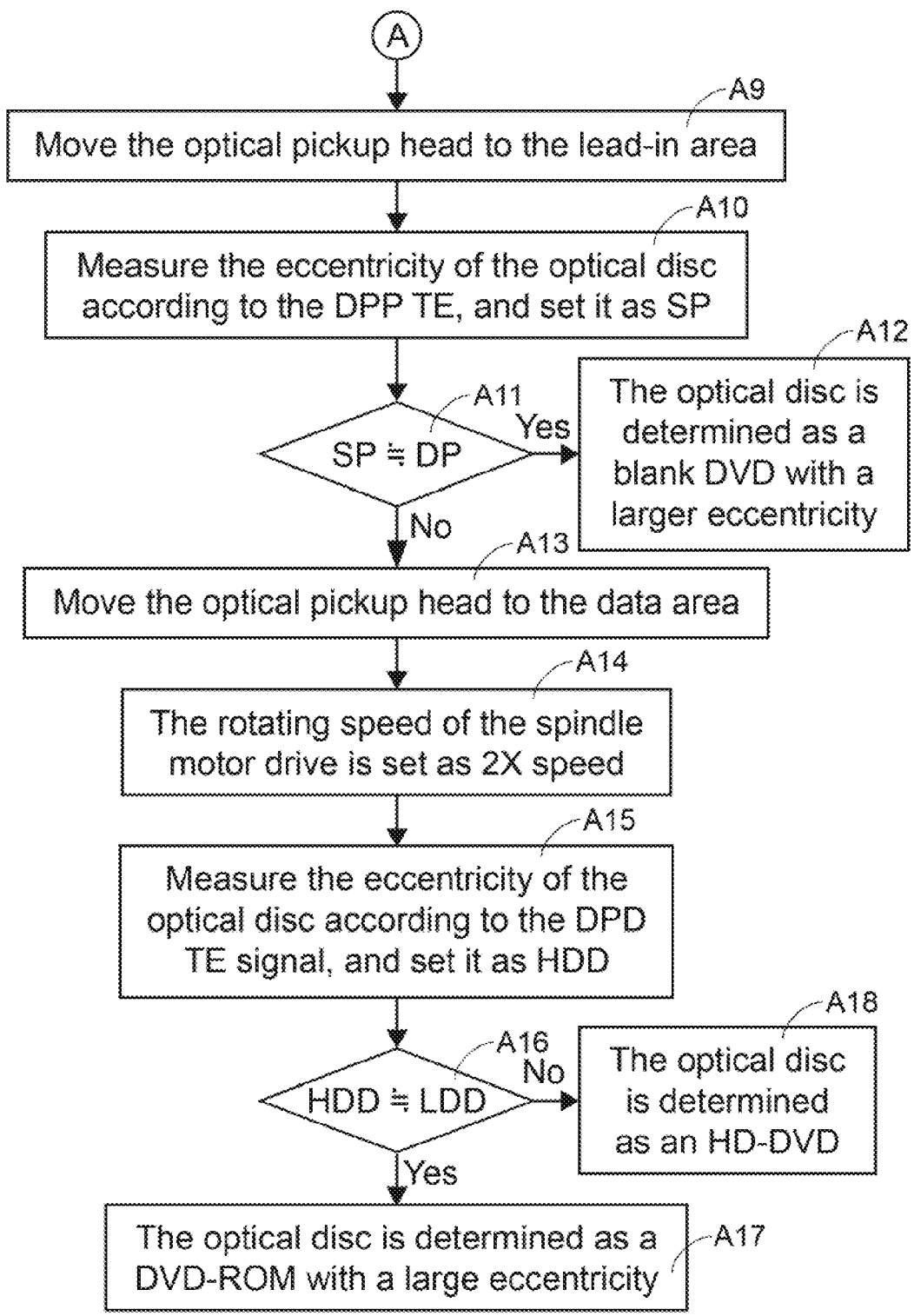
Figure 5A:
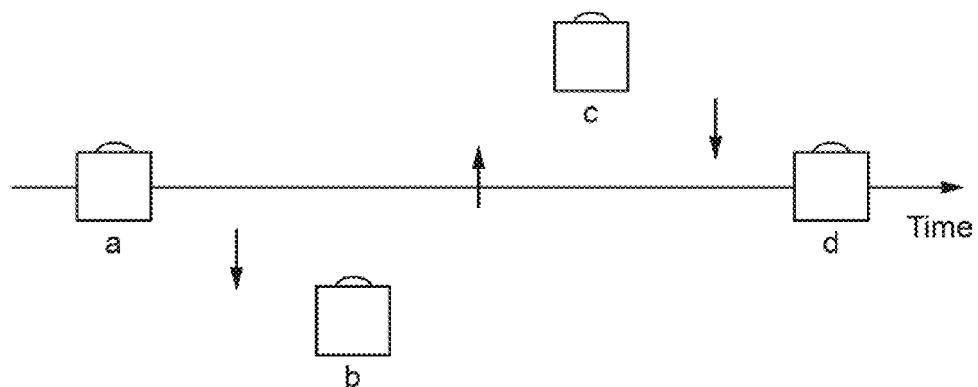
FIG. 5A~FIG. 5D are diagrams illustrating a fifth conventional method for discriminating low density optical discs from high density optical discs according to prior art.
Figure 5B:
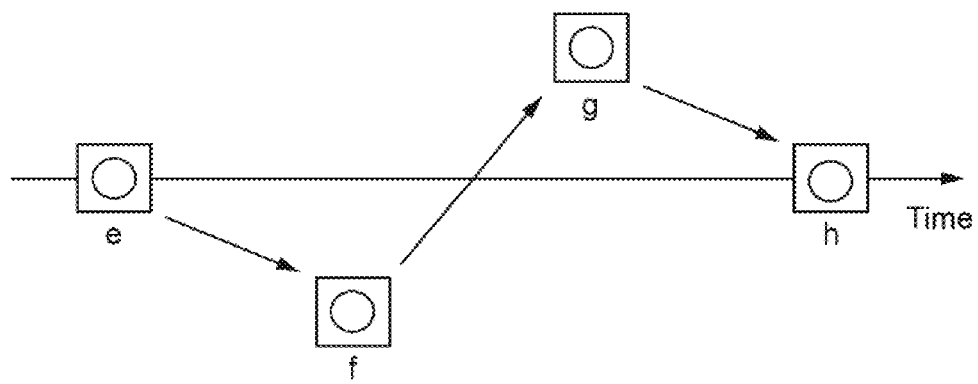
Figure 5C:
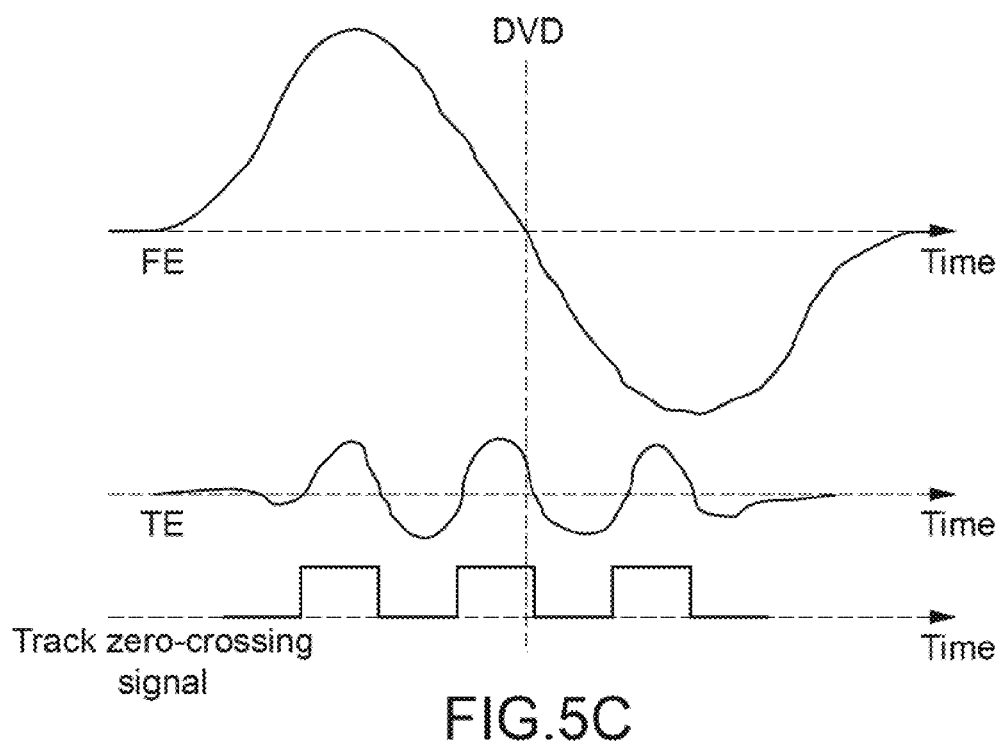
Figure 5D:
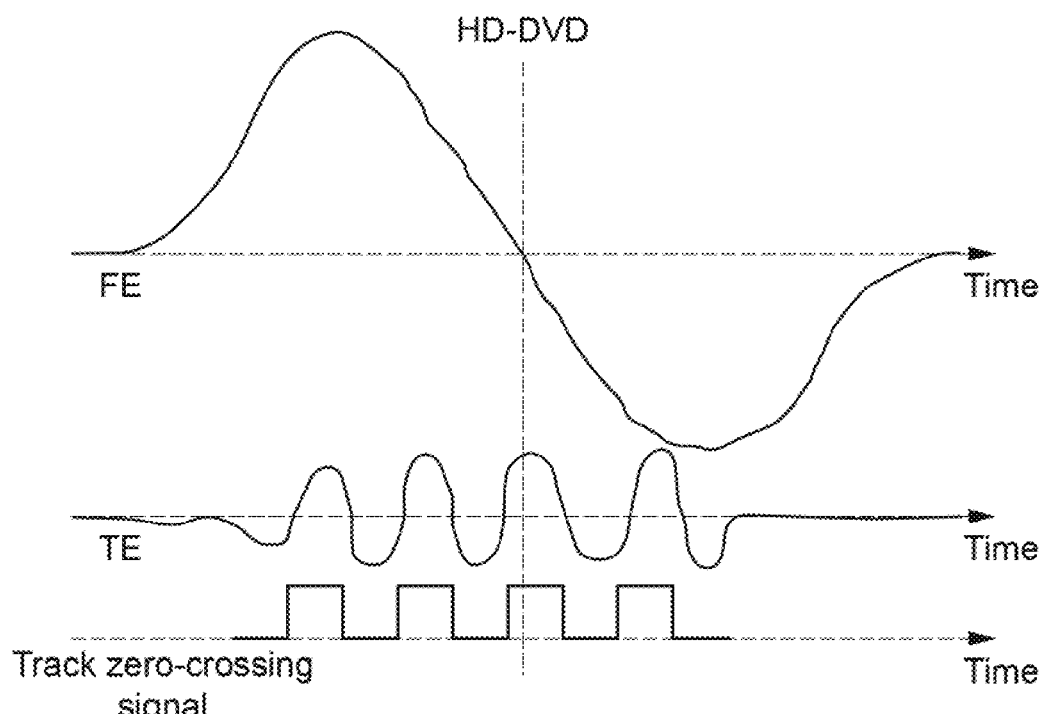
Figure 6A:
FIG. 6A~FIG. 6I are diagrams illustrating a sixth conventional method for discriminating low density optical discs from high density optical discs according to prior art.
Figure 6B:
Figure 6C:
Figure 6D:
Figure 6E:
Figure 6F:
Figure 6G:
Figure 6H:
Figure 6I:
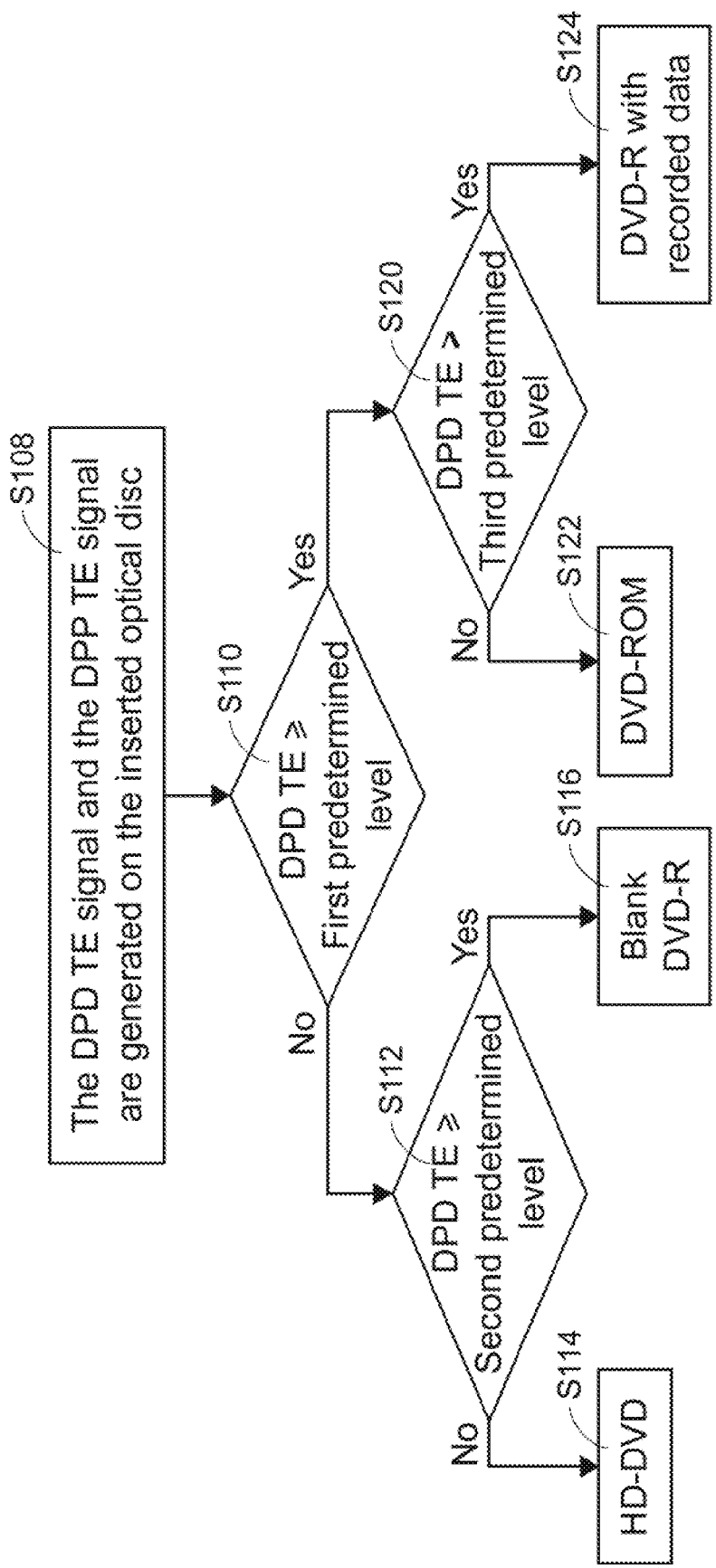
Figures 7A, 7B:
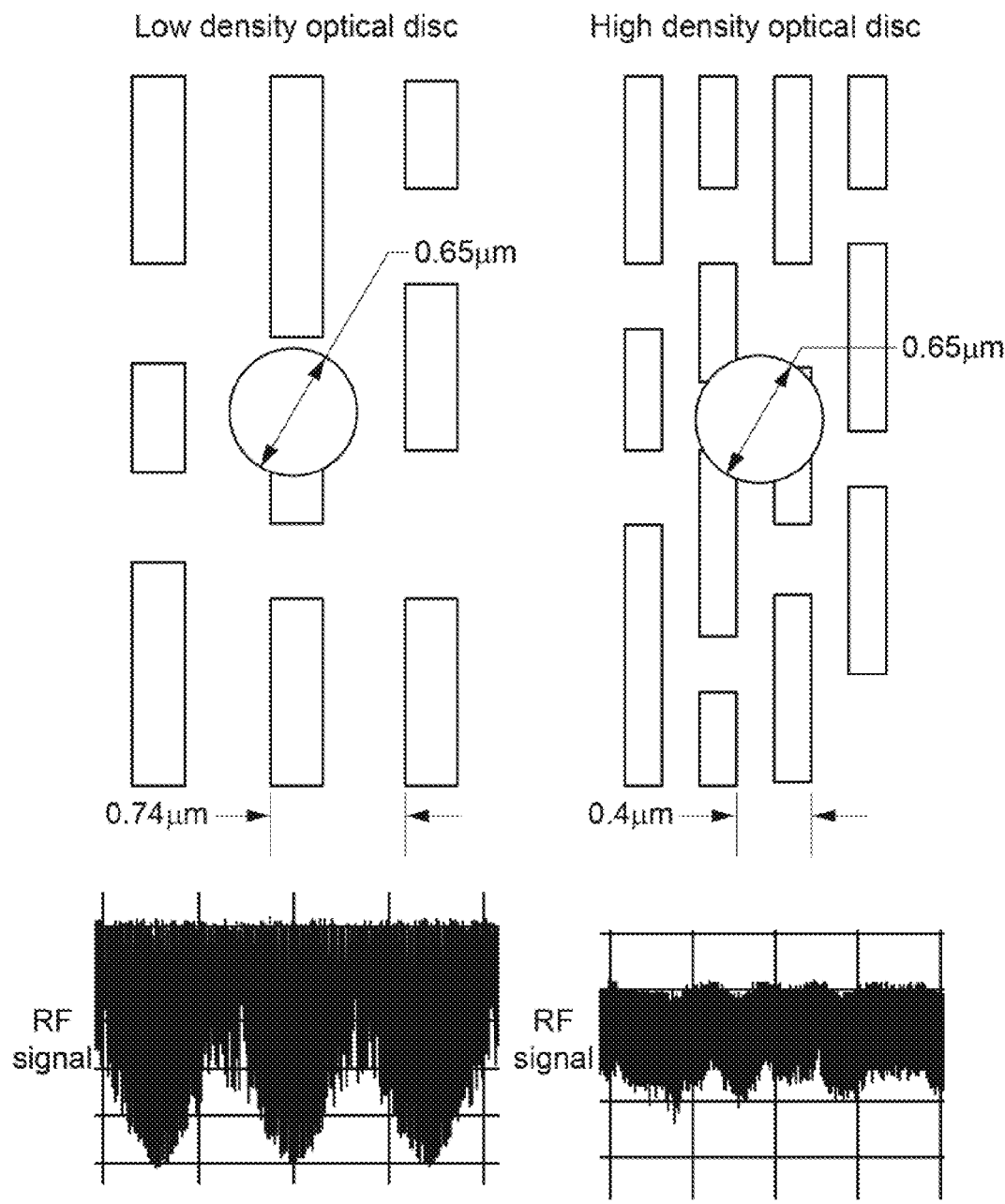
FIG. 7A is a diagram showing a radio frequency signal formed by focusing a red laser source on a low density optical disc.
FIG. 7B is a diagram showing a radio frequency signal formed by focusing a red laser source on a high density optical disc.

Please refer to FIG. 7A. FIG. 7A is a diagram showing a radio frequency signal formed by focusing a red laser source on a low density optical disc. Since a beam spot generated by the red laser source has a diameter about 0.65 µm, this beam spot is capable of successfully aiming at a single track of the DVD or the CD. When the beam spot is moved in-between the tracks, it will not be radiated to a plurality of tracks at the same time. Therefore, a stronger radio frequency signal can be generated.

Please refer to FIG. 7B. FIG. 7B is a diagram showing a radio frequency signal formed by focusing a red laser source on a high density optical disc. Since the beam spot generated by the red laser source is radiated to a plurality of tracks of the high density optical disc at the same time, a weaker radio signal is generated due to cross-talk.

Figure 8A:
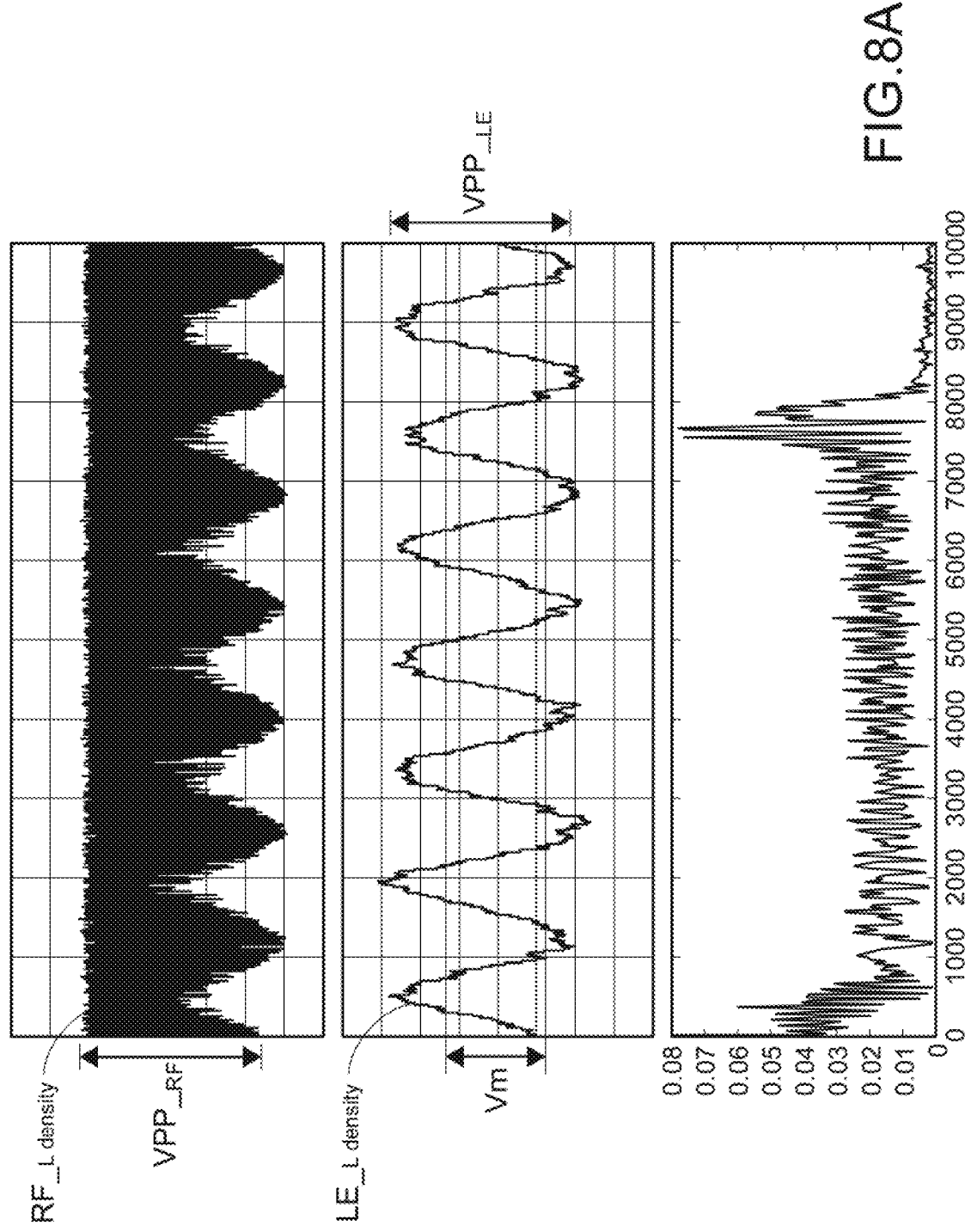
FIG. 8A is a diagram showing a radio frequency signal, a lower envelope signal, and the spectrum of the lower envelope signal formed by focusing a red laser source on a low density optical disc.

FIG. 8A is a diagram showing a radio frequency signal ($RF_{\_L\ density}$), a lower envelope signal ($LE_{\_L\ density}$), and the spectrum of the lower envelope signal ($LE_{\_L\ density}$) formed by focusing a red laser source on a low density optical disc. As can be seen from FIG. 8A, the peak-to-peak value VPP_LE of the lower envelope signal ($LE_{\_L\ density}$) is greater than a predetermined value Vm. As can be known from the spectrum of the lower envelope signal ($LE_{\_L\ density}$), the frequency range of the lower envelope signal ($LE_{\_L\ density}$) approximately falls in-between 0~8000 Hz.

Figure 8B:
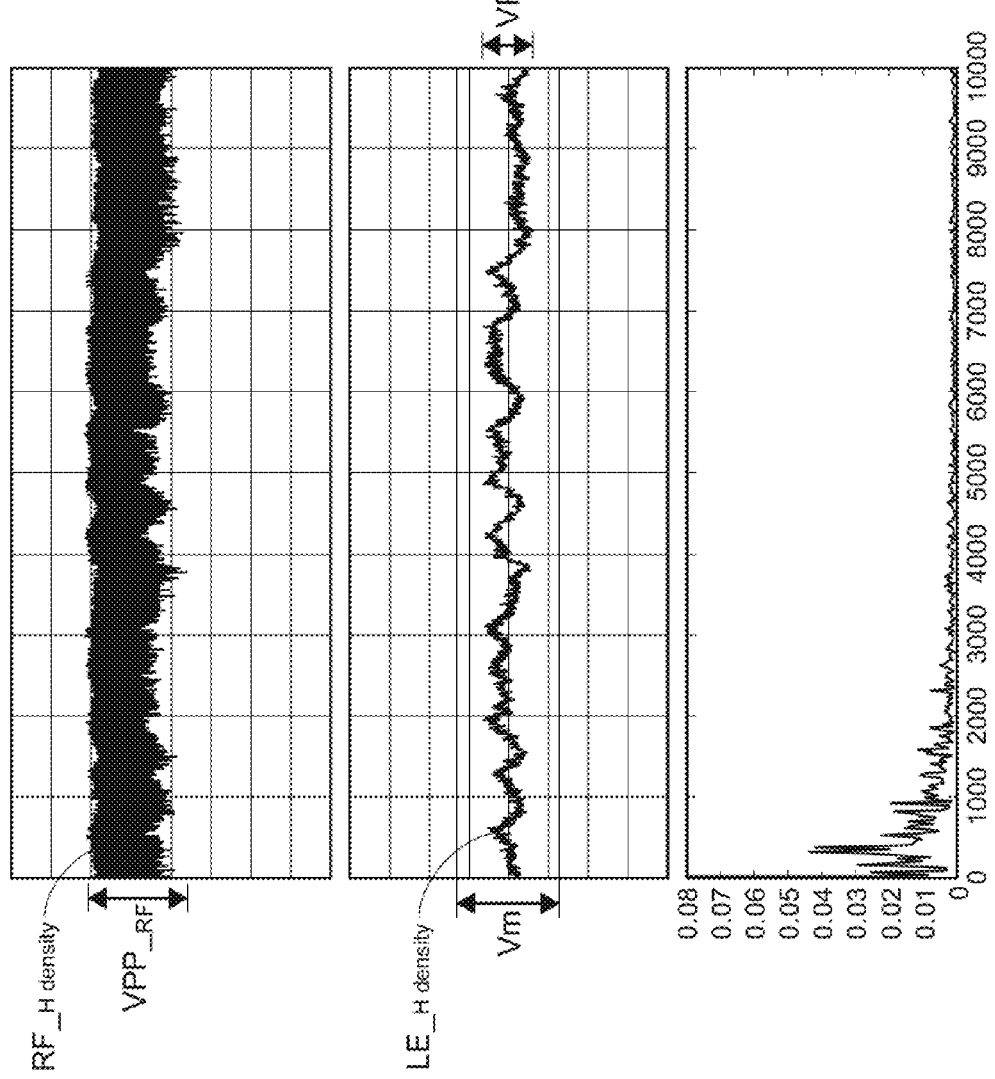
FIG. 8B is a diagram showing a radio frequency signal, a lower envelope signal, and the spectrum of the lower envelope signal formed by focusing a red laser source on a high density optical disc.

FIG. 8B is a diagram showing a radio frequency signal ($RF_{\_H\ density}$), a lower envelope signal ($LE_{\_H\ density}$), and the spectrum of the lower envelope signal ($LE_{\_H\ density}$) formed by focusing a red laser source on a high density optical disc. As can be seen from FIG. 8B, a peak-to-peak value VPP_LE of the lower envelope signal ($LE_{\_H\ density}$) is greater than the predetermined value Vm. As can be known from the spectrum of the lower envelope signal ($LE_{\_H\ density}$), the frequency range of the lower envelope signal ($LE_{\_H\ density}$) approximately falls in-between 0~1000 Hz.

By reference to the abovementioned features, the optical disc can be determined as a low density optical disc or a high density optical disc according to the peak-to-peak value or the frequency of the lower envelope signal.

Figure 9A:
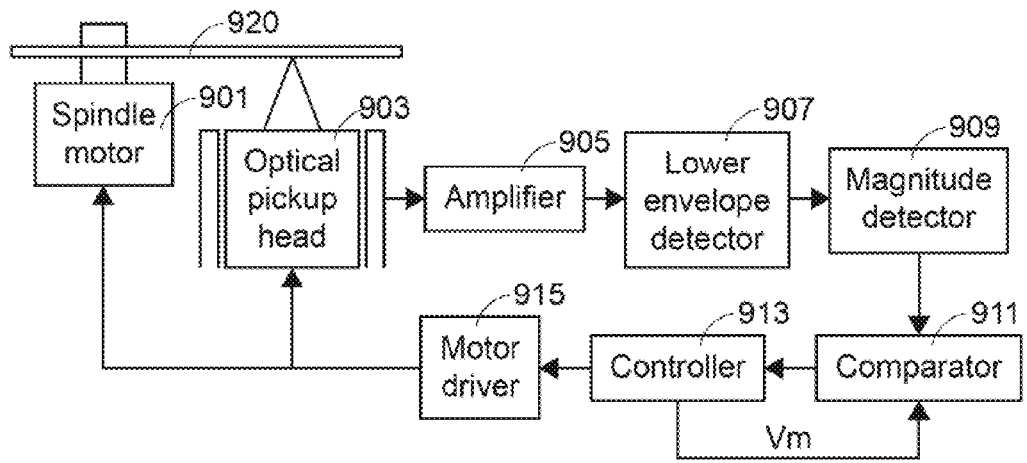
FIG. 9A and FIG. 9B are diagrams illustrating an apparatus and a method for discriminating different types of optical discs according to a first embodiment of the present invention.
Figure 9B:
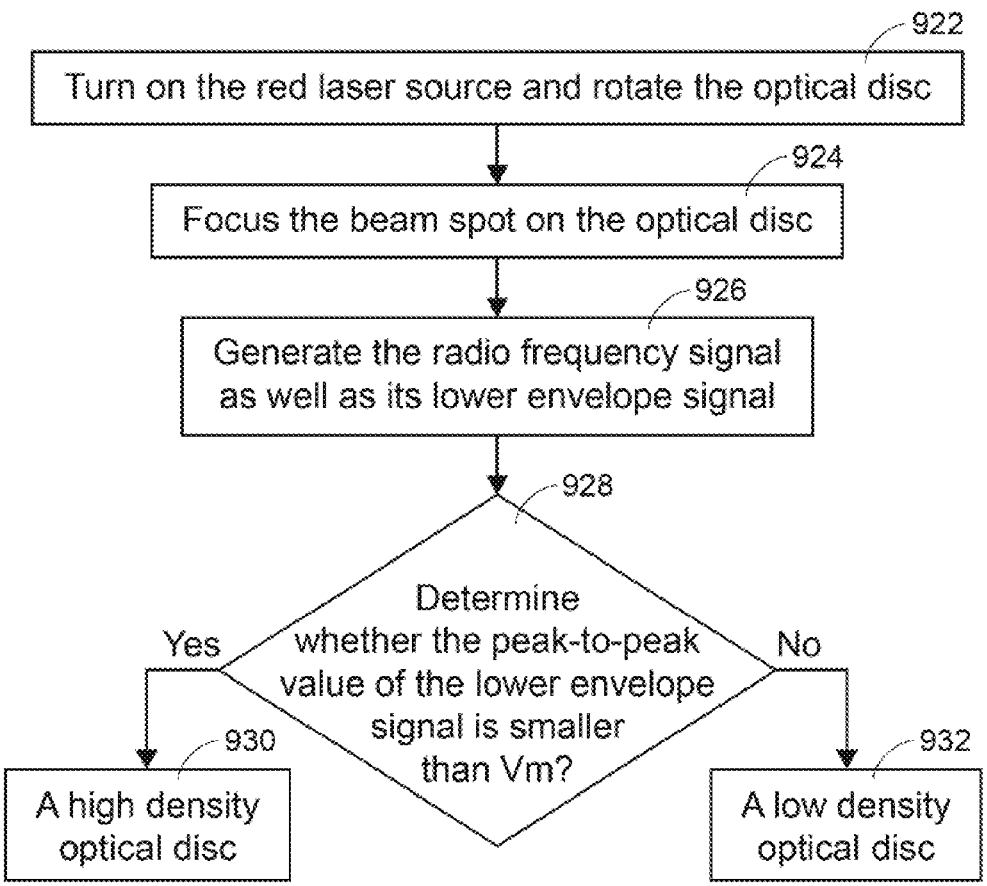

Please refer to FIG. 9A and FIG. 9B. FIG. 9A and FIG. 9B are diagrams illustrating an apparatus and a method for discriminating different types of optical discs according to a first embodiment of the present invention. As shown in FIG. 9A, the apparatus consists of a spindle motor 901, an optical pickup head 903, an amplifier 905, a lower envelope detector 907, a magnitude detector 909, a comparator 911, a controller 913, and a motor driver 915.

The controller 913 generates a driving signal to the motor driver 915, so as to control the rotations of the spindle motor 901 as well as the movement of the optical pickup head 903 when performing a focusing operation or a tracking operation on the optical disc 920. In addition, the optical pickup head 903 generates a plurality of optical signals to the amplifier 905, and the amplifier 905 combines and amplifies the plurality of optical signals into a radio frequency (RF) signal to be sent to the lower envelope detector 907 for generating the lower envelope (LE) signal. The magnitude detector 909 receives the lower envelope signal and generates the peak-to-peak value of the lower envelope signal to the comparator 911. Moreover, the comparator 911 compares the peak-to-peak value of the lower envelope signal with the predetermined value Vm provided by the controller 913, so as to output a comparison signal to the controller 913. After that, the optical disc 920 can be determined as a low density optical disc or a high density optical disc according to the comparison signal by the controller 913.

As shown in FIG. 9B, the method includes the following steps. First, turn on the red laser source and rotate the optical disc (Step 922). Focus the beam spot generated by the red laser source on the optical disc (Step 924), so as to generate the radio frequency signal and its lower envelope signal (Step 926). Next, compare the peak-to-peak value of the lower envelope signal with a predetermined value Vm (Step 928). When the peak-to-peak value of the lower envelope signal is smaller than the predetermined value Vm, the optical disc is determined as a high density optical disc (Step 930); otherwise, when the peak-to-peak value of the lower envelope signal is greater than the predetermined vale Vm, the optical disc is determined as a low density optical disc (Step 932).

Figure 10A:
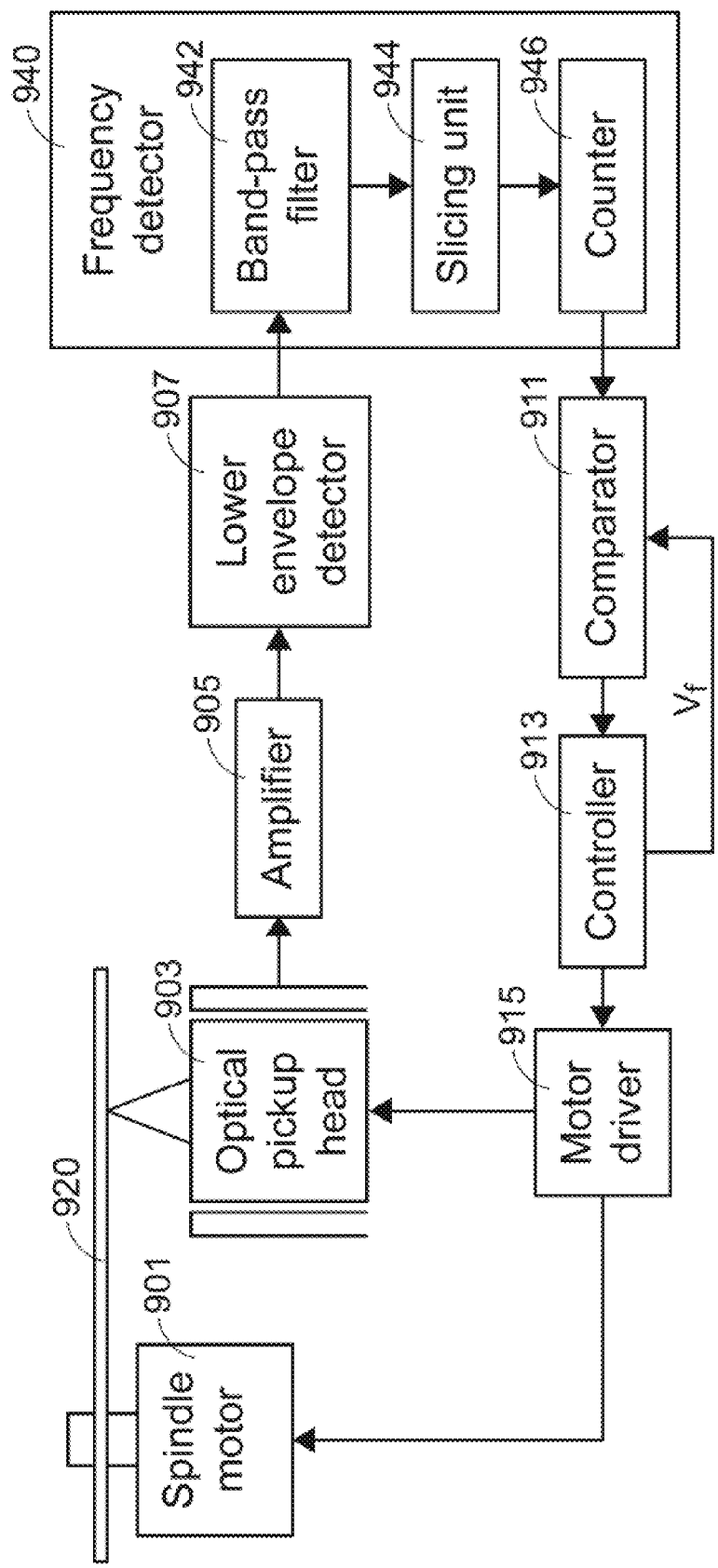
FIG. 10A and FIG. 10B are diagrams illustrating an apparatus and a method for discriminating different types of optical discs according to a second embodiment of the present invention.
Figure 10B:
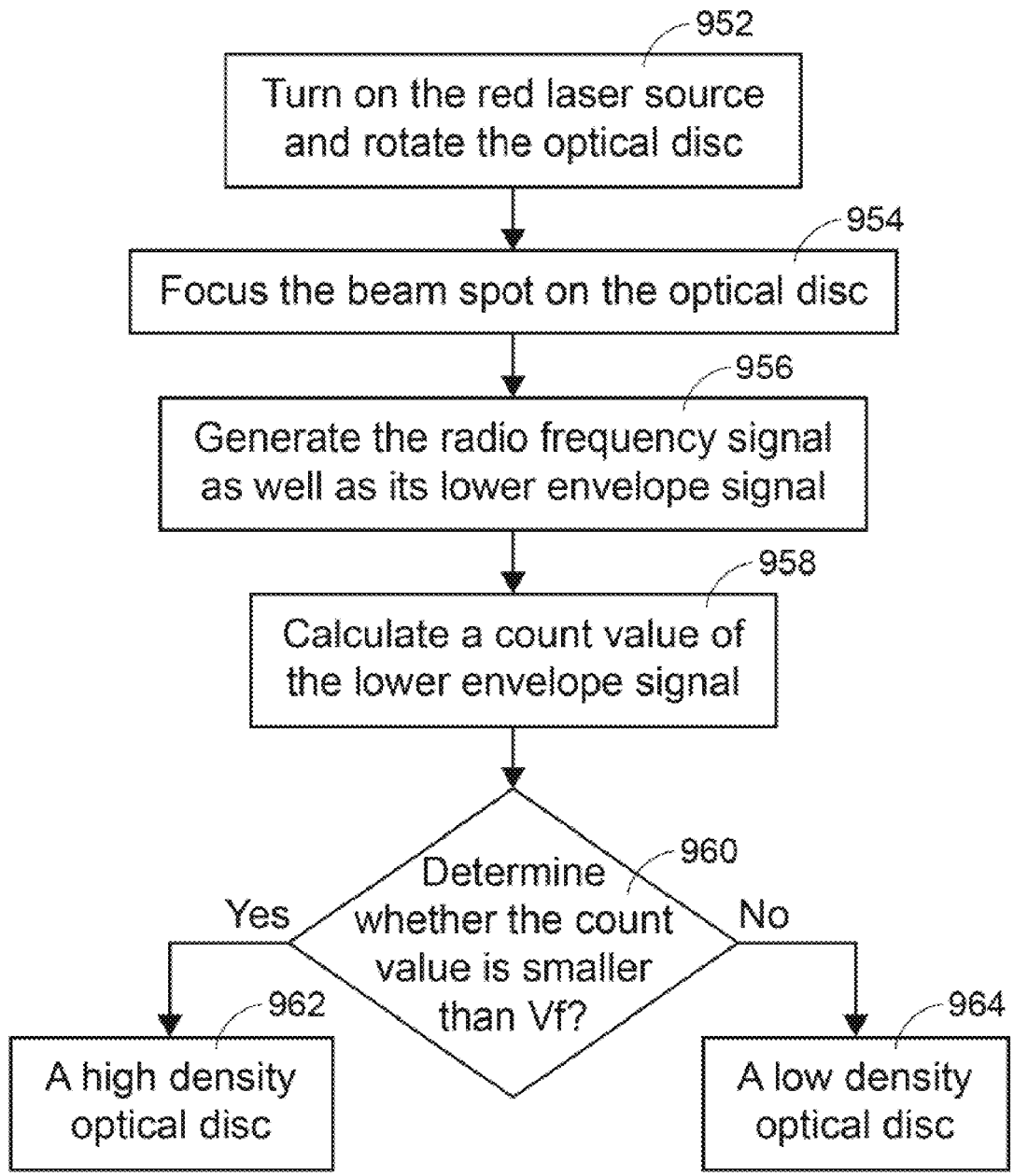

Please refer to FIG. 10A and FIG. 10B. FIG. 10A and FIG. 10B are diagrams illustrating an apparatus and a method for discriminating different types of optical discs according to a second embodiment of the present invention. As shown in FIG. 10A, the apparatus consists of a spindle motor 901, an optical pickup head 903, an amplifier 905, a lower envelope detector 907, a frequency detector 940, a comparator 911, a controller 913, and a motor driver 915. The frequency detector 940 further consists of a band-pass filter 942, a slicing unit 944 and a counter 946.

The controller 913 generates a driving signal to the motor driver 915, so as to control the rotations of the spindle motor 901 as well as the movement of the optical pickup head 903 when performing a focusing operation or a tracking operation on the optical disc 920. In addition, the optical pickup head 903 generates a plurality of optical signals to the amplifier 905, and the amplifier 905 combines and amplifies the plurality of optical signals into a radio frequency (RF) signal to be sent to the lower envelope detector 907 for generating the lower envelope (LE) signal. The frequency detector 940 receives the lower envelope signal and generates a count value of the lower envelope signal to the comparator 911. Moreover, the comparator 911 compares the count value of the lower envelope signal with a predetermined count value Vf provided by the controller 913, so as to output a comparison signal to the controller 913. After that, the optical disc 920 can be determined as a low density optical disc or a high density optical disc according to the comparison signal by the controller 913. In addition, after the lower envelope signal passes through the band-pass filter 942 of the frequency detector 940, a filtered lower envelope signal can be generated to the slicing unit 944. The slicing unit 944 then slices the filtered lower envelope signal to form a square-wave signal to be sent to the counter 946. The counter 946 calculates a pulse number of the square-wave signal as the count value. In other words, the filtered lower envelope signal with a higher frequency has a larger count value; otherwise, the filtered lower envelope signal with a lower frequency has a smaller count value.

As shown in FIG. 10B, the method includes the following steps. First, turn on the red laser source and rotate the optical disc (Step 952). Focus the beam spot generated by the red laser source on the optical disc (Step 954), so as to generate the radio frequency signal and its lower envelope signal (Step 956). Calculate a count value of the lower envelope signal (Step 958). Next, compare the count value of the lower envelope signal with a predetermined count value Vf (Step 960). When the count value of the lower envelope signal is smaller than the predetermined count value Vf, the optical disc is determined as a high density optical disc (Step 962); otherwise, when the count value of the lower envelope signal is greater than the predetermined count vale Vf, the optical disc is determined as a low density optical disc (Step 964).

According to the first embodiment and the second embodiment of the present invention, those skilled in the art should appreciate that an envelope difference signal can be generated by subtracting the lower envelope signal from the upper envelope signal of the radio frequency signal. Therefore, the same judgment result can be obtained by reference to the peak-to-peak value or the frequency of the envelope difference signal except for by reference to the lower envelope signal, and further description is omitted here for brevity.

Please refer back to FIG. 8A and FIG. 8B. According to an embodiment of the present invention, the type of an optical disc can be determined by reference to the peak-to-peak value (VPP_RF) of the radio frequency signal and the peak-to-peak value (VPP_LE) of the lower envelope signal.

Figure 11:
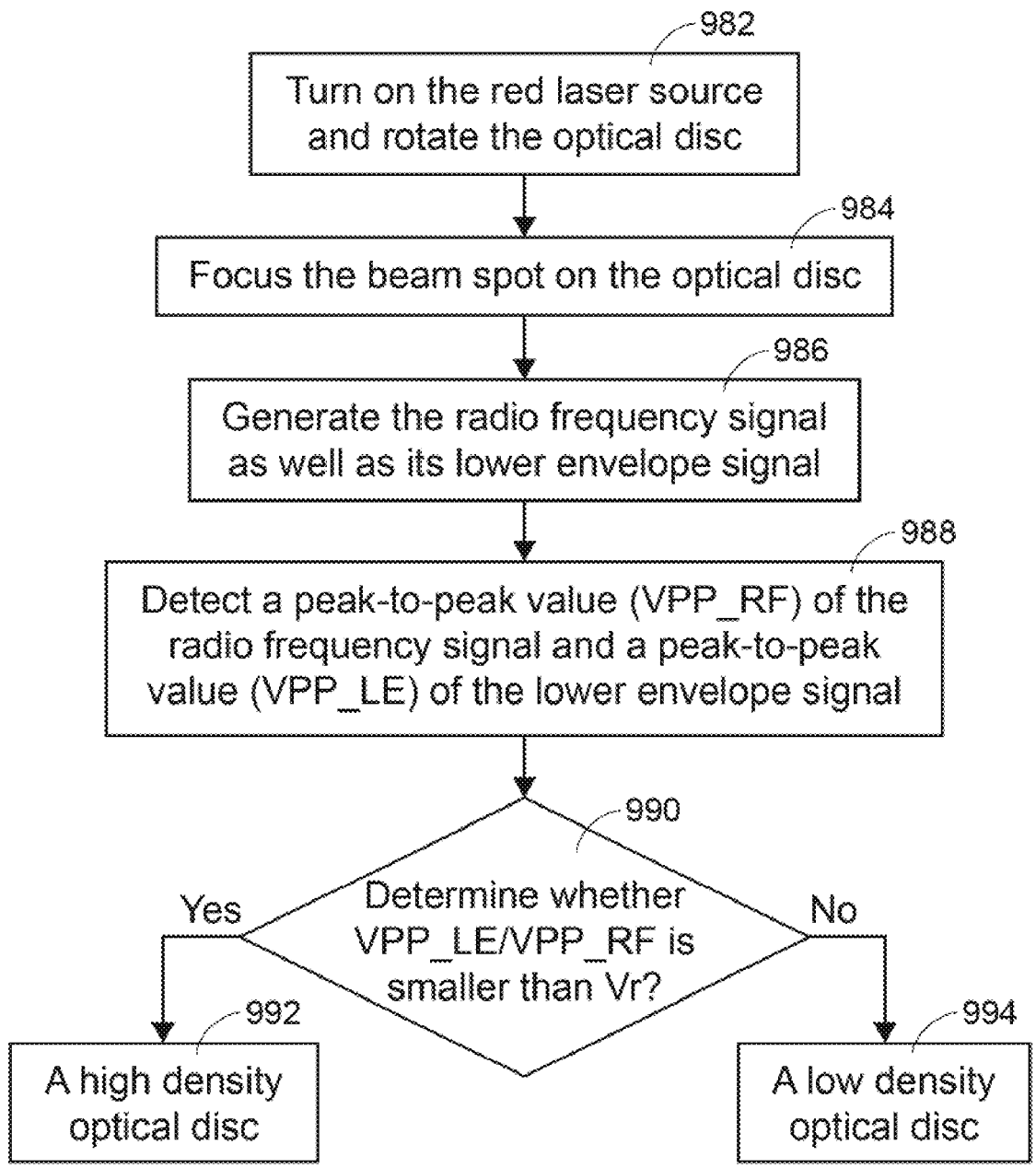
FIG. 11 is a flowchart illustrating a method for discriminating different types of optical discs according to a third embodiment of the present invention.

Please refer to FIG. 11, which is a flowchart illustrating a method for discriminating different types of optical discs according to a third embodiment of the present invention. The method includes the following steps. First, turn on the red laser source and rotate the optical disc (Step 982). Focus the beam spot generated by the red laser source on the optical disc (Step 984), so as to generate the radio frequency signal and its lower envelope signal (Step 986). Detect a peak-to-peak value (VPP_RF) of the radio frequency signal and a peak-to-peak value (VPP_LE) of the lower envelope signal (Step 988). Next, compare a ratio VPP_LE/VPP_RF with a predetermined ratio Vr (Step 990). When the ratio VPP_LE/VPP_RF is smaller than the predetermined ratio Vr, the optical disc is determined as a high density optical disc (Step 992); otherwise, when the ratio VPP_LE/VPP_RF is greater than the predetermined ratio Vr, the optical disc is determined as a low density optical disc (Step 994).

In general, the ratio VPP_LE/VPP_RF of a low density optical disc is about 60%, while the ratio VPP_LE/VPP_RF of a high density optical disc is about 20%. Accordingly, the predetermined ratio Vr can be set as 30% to be the reference for determining the low density optical disc or the high density optical disc.

In conclusion, the peak-to-peak value (VPP_RF) of the radio frequency signal and the peak-to-peak value (VPP_LE) of the lower envelope signal or the frequency of the lower envelope signal are adopted to discriminate the type of the optical disc in the present invention. Although the peak-to-peak value (VPP_RF) of the radio frequency signal and the peak-to-peak value (VPP_LE) of the lower envelope signal might be affected by the reflectivity of the optical disc, the frequency of the lower envelope signal won't be affected by the reflectivity of the optical disc. Therefore, the interference from the reflectivity of the optical disc can be avoided and the judgment result won't be affected. In addition, the peak-to-peak value (VPP_RF) of the radio frequency signal and the peak-to-peak value (VPP_LE) of the lower envelope signal are adopted for differentiating the types of the optical disc in the present invention. Although both the values of VPP_LE and VPP_RF might be affected by the reflectivity of the optical disc, the probability that the ratio VPP_LE/VPP_RF is affected by the reflectivity of the optical disc becomes much smaller. Similarly, the interference from the reflectivity of the optical disc can be avoided.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of discriminating different types of optical discs, applied to an optical disc drive, the method comprising:
    focusing a beam spot generated by a laser source of the optical disc drive on the optical disc, and rotating the optical disc;
    generating a radio frequency signal and a lower envelope signal of the radio frequency signal correspondingly;
    comparing a peak-to-peak value of the lower envelope signal with a predetermined value; and
    determining the optical disc as a high density optical disc when the peak-to-peak value of the lower envelope signal is smaller than the predetermined value, and determining the optical disc as a low density optical disc when the peak-to-peak value of the lower envelope signal is greater than the predetermined value.

2. The method of discriminating different types of optical discs of claim 1, wherein the laser source is a red laser source.

3. The method of discriminating different types of optical discs of claim 1, wherein the high density optical disc is a blue-ray disc or an HD-DVD, and the low density optical disc is a CD or a DVD.

4. An apparatus for discriminating different types of optical discs, the apparatus comprising;
    a spindle motor, for loading and rotating an optical disc;
    an optical pickup head, for radiating a laser source and focusing the laser source on the optical disc to generate a plurality of optical signals;
    an amplifier, for combining and amplifying the plurality of optical signals into a radio frequency signal;
    a lower envelope detector, for receiving the radio frequency signal and for generating a lower envelope signal in response to the radio frequency signal; and
    a circuit, for determining whether the optical disc is a high density optical disc or a low density optical disc according to a peak-to-peak value of the lower envelope signal.

5. The apparatus for discriminating different types of optical discs of claim 4, wherein the circuit comprises:
    a magnitude detector, for generating the peak-to-peak value of the lower envelope signal according to the lower envelope signal;
    a comparator, for comparing the peak-to-peak value of the lower envelope signal with a predetermined value to output a comparison signal; and
    a controller, for determining whether the optical disc is a high density optical disc when the peak-to-peak value of the lower envelope signal is smaller than the predetermined value or a low density optical disc when the peak-to-peak value of the lower envelope signal is greater than the predetermined value according to the comparison signal.

6. The apparatus for discriminating different types of optical discs of claim 4, wherein the laser source is a red laser source.

7. The apparatus for discriminating different types of optical discs of claim 4, wherein the high density optical disc is a blue-ray disc or an HD-DVD, and the low density optical disc is a CD or a DVD.

8. The apparatus for discriminating different types of optical discs of claim 4, wherein the circuit comprises:
 a frequency detector, for receiving the lower envelope signal and for generating a count value of the lower envelope signal according to the lower envelope signal;
 a comparator, for comparing the count value of the lower envelope signal with a predetermined count value to output a comparison signal; and
 a controller, for outputting the predetermined count value to the comparator and for determining whether the optical disc is a high density optical disc when the count value of the lower envelope signal is smaller than the predetermined count value or a low density optical disc when the count value of the lower envelope signal is greater than the predetermined count value according to the comparison signal.

9. The apparatus for discriminating different types of optical discs of claim 8, wherein the frequency detector further comprises:
 a band-pass filter, for filtering the lower envelope signal to generate a filtered lower envelope signal;
 a slicing unit, for slicing the filtered lower envelope signal to form a square-wave signal; and
 a counter, for calculating a pulse number of the square-wave signal as the count value.

10. A method of discriminating different types of optical discs, applied to an optical disc drive, the method comprising:
 focusing a beam spot generated by a laser source of the optical disc drive on the optical disc, and rotating the optical disc;
 generating a radio frequency signal and a lower envelope signal of the radio frequency signal correspondingly;
 generating a square-wave in response to the lower envelope signal;
 calculating a pulse number of the square-wave signal as a count value;
 comparing the count value of the lower envelope signal with a predetermined count value; and
 determining the optical disc as the high density optical disc when the count value of the lower envelope signal is smaller than the predetermined count value, and determining the optical disc as the low density optical disc when the count value of the lower envelope signal is greater than the predetermined count value.

11. The method of discriminating different types of optical discs of claim 10, wherein the laser source is a red laser source.

12. The method of discriminating different types of optical discs of claim 10, wherein the step of generating a square-wave in response to the lower envelope signal comprising:
 filtering the lower envelope signal to generate a filtered lower envelope signal; and
 slicing the filtered lower envelope signal to form the square-wave signal.

13. The method of discriminating different types of optical discs of claim 10, wherein the high density optical disc is a blue-ray disc or an HD-DVD, and the low density optical disc is a CD or a DVD.

14. A method of discriminating different types of optical discs, applied to an optical disc drive, the method comprising:
 focusing a beam spot generated by a laser source on the optical disc, and rotating the optical disc;
 generating a radio frequency signal and a corresponding lower envelope signal of the radio frequency signal;
 detecting a first peak-to-peak value of the radio frequency signal;
 detecting a second peak-to-peak value of the lower envelope signal;
 dividing the second peak-to-peak value by the first peak-to-peak value, so as to set as a first ratio;
 comparing the first ratio with a predetermined ratio; and
 determining the optical disc as the high density optical disc when the first ratio is smaller than the predetermined ratio, and determining the optical disc as the low density optical disc when the first ratio is greater than the predetermined ratio.

15. The method of discriminating different types of optical discs of claim 14, wherein the high density optical disc is a blue-ray disc or an HD-DVD, and the low density optical disc is a CD or a DVD.

\* \* \* \* \*